United States Patent [19]

Conner et al.

[11] Patent Number: 5,050,965

[45] Date of Patent: * Sep. 24, 1991

[54] COLOR DISPLAY USING SUPERTWISTED NEMATIC LIQUID CRYSTAL MATERIAL

[75] Inventors: Arlie R. Conner, Portland; Paul E. Gulick, Tualatin, both of Oreg.

[73] Assignee: In Focus Systems, Inc., Tualatin, Oreg.

[ * ] Notice: The portion of the term of this patent subsequent to Apr. 17, 2007 has been disclaimed.

[21] Appl. No.: 445,769

[22] Filed: Nov. 22, 1989

Related U.S. Application Data

[63] Continuation-in-part of Ser. No. 402,134, Sep. 1, 1989, Pat. No. 4,917,465, and a continuation-in-part of Ser. No. 378,997, Jul. 12, 1989, Pat. No. 4,952,036, and a continuation-in-part of Ser. No. 363,099, Jun. 7, 1989, Pat. No. 4,966,441, and a continuation-in-part of Ser. No. 329,938, Mar. 28, 1989, abandoned.

[51] Int. Cl.$^5$ ............................................. G02F 1/13
[52] U.S. Cl. ........................................ 359/53; 359/64; 359/73; 359/93
[58] Field of Search ............ 350/335, 337, 334, 339 F, 350/347 E, 347 V, 339 R

[56] References Cited

U.S. PATENT DOCUMENTS

| | | | |
|---|---|---|---|
| 3,703,329 | 11/1972 | Castellano | 350/349 |
| 3,785,721 | 1/1974 | Harsch | 350/337 |
| 3,811,751 | 5/1974 | Myer | 350/345 |
| 3,863,246 | 1/1975 | Trcka et al. | 340/324 R |
| 3,915,554 | 10/1975 | Maezawa | 350/347 R |
| 4,006,968 | 2/1977 | Ernstoff et al. | 350/160 LC |
| 4,044,546 | 8/1977 | Koike | 58/50 R |
| 4,068,926 | 1/1978 | Nakamura et al. | 350/337 |
| 4,097,128 | 6/1978 | Matsumoto et al. | 350/335 |
| 4,097,130 | 6/1978 | Cole, Jr. | 350/335 |
| 4,127,322 | 11/1978 | Jacobson et al. | 353/31 |
| 4,171,874 | 10/1979 | Bigelow et al. | 350/345 |
| 4,232,948 | 11/1980 | Shanks | 350/347 R |
| 4,241,339 | 12/1980 | Ushiyama | 340/702 |
| 4,257,682 | 3/1981 | Suzuki et al. | 350/349 |
| 4,299,447 | 11/1981 | Soltan et al. | 350/334 |
| 4,349,817 | 9/1982 | Hoffman et al. | 340/784 |
| 4,394,069 | 7/1983 | Kaye | 350/347 E |
| 4,411,496 | 10/1983 | Nonomura et al. | 350/347 E |
| 4,416,514 | 11/1983 | Plummer | 350/335 |
| 4,487,481 | 12/1984 | Suzawa | 350/345 |
| 4,547,043 | 10/1985 | Penz | 350/335 |
| 4,580,876 | 4/1986 | Stolov et al. | 350/335 X |
| 4,597,636 | 7/1986 | Hoshikawa | 350/334 |
| 4,608,558 | 8/1986 | Amstutz et al. | 340/784 |
| 4,613,207 | 9/1986 | Fergason | 350/331 R |
| 4,634,229 | 1/1987 | Amstutz et al. | 350/346 |
| 4,651,148 | 3/1987 | Takeda et al. | 340/805 |
| 4,652,101 | 3/1987 | Grunwald | 353/122 |
| 4,659,183 | 4/1987 | Suzawa | 350/345 |
| 4,671,634 | 6/1987 | Kizaki et al. | 353/122 |
| 4,697,884 | 10/1987 | Amstutz et al. | 350/334 |
| 4,722,593 | 2/1988 | Shimazaki | 350/336 |
| 4,723,840 | 2/1988 | Humbert et al. | 350/345 |
| 4,726,663 | 2/1988 | Buzak | 350/347 E |
| 4,745,406 | 5/1988 | Hayashi et al. | 340/784 |
| 4,756,604 | 7/1988 | Nakatsuka et al. | 350/331 R |
| 4,758,818 | 7/1988 | Vatne | 340/701 |
| 4,759,612 | 7/1988 | Nakatsuka et al. | 350/337 |
| 4,770,500 | 9/1988 | Kalmanash et al. | 350/347 E |
| 4,770,525 | 9/1988 | Umeda et al. | 353/122 |
| 4,796,978 | 1/1989 | Tanaka et al. | 350/337 |
| 4,812,034 | 3/1989 | Mochizuki et al. | 383/122 |
| 4,813,770 | 3/1989 | Clerc et al. | 350/347 E |
| 4,832,461 | 5/1989 | Yamagishi et al. | 350/347 E |
| 4,838,655 | 6/1989 | Hunahata et al. | 350/335 |
| 4,842,379 | 6/1989 | Oishi et al. | 350/347 G |
| 4,844,569 | 7/1989 | Wada et al. | 350/335 |
| 4,877,309 | 10/1989 | Takamatsu | 350/337 |
| 4,927,240 | 5/1990 | Stolov et al. | 350/335 |

FOREIGN PATENT DOCUMENTS

| | | | |
|---|---|---|---|
| 0311405 | 4/1989 | European Pat. Off. | 350/334 |
| 50-110296 | 8/1975 | Japan . | |

(List continued on next page.)

Primary Examiner—Stanley D. Miller
Assistant Examiner—Huy K. Mai
Attorney, Agent, or Firm—Townsend and Townsend

[57] ABSTRACT

A color display is formed by stacking two or more birefringent elements that are tuned to provide different spectral characteristics, and operating each of the elements independently.

64 Claims, 17 Drawing Sheets

FOREIGN PATENT DOCUMENTS

| | | |
|---|---|---|
| 50-110297 | 8/1975 | Japan . |
| 53-55049 | 5/1978 | Japan . |
| 54-59162 | 5/1979 | Japan . |
| 55-159415 | 12/1980 | Japan . |
| 56-121076 | 9/1981 | Japan . |
| 56-140320 | 11/1981 | Japan . |
| 58-224376 | 12/1983 | Japan . |
| 59-189317 | 10/1984 | Japan . |
| 59-219719 | 12/1984 | Japan . |
| 0194426 | 10/1985 | Japan ........................ 350/335 |
| 60-238815 | 11/1985 | Japan . |
| 61-100725 | 5/1986 | Japan . |
| 62-125328 | 6/1987 | Japan . |
| 0153832 | 7/1987 | Japan ........................ 350/337 |
| 62-164024 | 7/1987 | Japan . |
| 63-49736 | 3/1988 | Japan . |
| 63-144326 | 6/1988 | Japan . |
| 63-195624 | 8/1988 | Japan . |
| 63-234225 | 9/1988 | Japan . |
| 63-264731 | 11/1988 | Japan . |
| 63-286819 | 11/1988 | Japan . |
| 64-44417 | 2/1989 | Japan . |
| 0147430 | 6/1989 | Japan ........................ 350/337 |

OTHER PUBLICATIONS

Heilmeier et al., "Guest-Host Interactions in Nematic Liquid Crystals. A New Electro-Optic Effect", Applied Physics Letters, Aug. 1, 1968, vol. 13, No. 3, pp. 91–92.

White et al., "New Absorptive Mode Reflective Liquid-Crystal Display Device", Journal of Applied Physics, vol. 45, No. 11, Nov., 1974, pp. 4718–4723.

Scheffer, Terry, "New Multicolor Liquid Crystal Displays That Use a Twisted Nematic Electo-Optical Cell", Journal of Applied Physics, vol. 44, No. 11, Nov. 1973, pp. 4799–4803.

Kotani et al., "Effect of Various Parameters on Matrix Display of SBE-Liquid Crystal Cells", Japan Display '86, pp. 384–386.

Assouline et al., "Two-Color Liquid-Crystal Display", Electronics Letters, Nov. 18, 1971, vol. 7, No. 23, pp. 699–700.

Kawachi et al., "Light Scattering Characteristics in Nematic-Cholesteric Mixtures with Positive Dielectric Anisotropy", Japan Journal of Appl. Phys., vol. 17, No. 7, Jul., '78, pp. 1245–1250.

Uchida et al., "Bright Dichroic Guest-Host LCDs Without a Polarizer", Proceedings of the SID, vol. 22/1, 1981, pp. 41–46.

Yamagishi et al., "A Multi-Colored Projection Display Using Nematic-Cholesteric Liquid Crystal", 1988 IEEE, pp. 204–207.

Mochizuki et al., "New Nematic-Cholesteric LCD Using Hysteresis Behavior", Proceedings of the SID, 1985, vol. 26/4, pp. 243–248.

Sato et al., "Novel Multicolor Liquid Crystal Display Without Color Filter", Japan Display '89, pp. 392–395. (The conference held in Japan on Aug. 16–18, 1989).

Uchida, T., "Multicolored Liquid Crystal Displays," Optical Engineering, May/Jun. 1984, vol. 23, No. 3, pp. 247–252.

Schickel et al., "Deformation of Nematic Liquid Crystals with Vertical Orientation in Electrical Fields", Applied Physcis Letters, vol. 19, No. 10, Nov. 15, 1971, pp. 391–393.

Iijima et al., "640×400 Pixels Multicolor STN-LCD Using Birefringence Effect", Japan Display '89, pp. 300–302.

Uchida, Tatsuo, "Color LCDs: Technical Developments", Japan Display '83, pp. 202–205.

Scheffer, T. J., "Liquid Crystal Color Displays", *Nonemissive Electrooptic Displays* (1976), pp. 45–78.

Scheffer, T. J. et al., "A New Highly Multiplexable Liquid Crystal Display", *Appl. Phys. Lett.* 45 (10), Nov. 1984, pp. 1021–1023.

Kinugawa, Kiyoshige et al., "640×400 Pixel LCD Using Highly Twisted Birefringence Effect", *SID 86 Digest*, pp. 122–125.

Kawasaki, Kazuo, "High-Density Performance Black and White Supertwisted Nematic LCD", *SID 87 Digest*, pp. 391–394.

Matsumoto, Shoichi et al., "A Single-Cell High-Quality Black & White ST LCD", Electron Device Engineering Laboratory, Toshiba Corporation, pp. 3–7.

Yamagishi, Y., et al., "A Multicolor Projection Display Using Nematic-Cholesteric Liquid Crystal", 1988 *IEEE*, pp. 204–207.

Jones, Mitt, "NEC Breaks New Ground with FIrst Color Portable", *PC Magazine*, Oct. 31, 1989, pp. 33–36.

Pryce, Dave, "Special Report", *EDN Magazine*, Oct. 12, 1989, pp. 103–114.

Waters, C. M., "Highly Multiplexable Dyed LCDs", *Proceedings of the SID*, vol. 25/4, 1984, pp. 261–264.

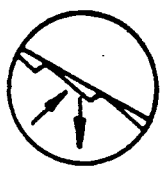
FIG. 19A.   FIG. 19B.
FIG. 23
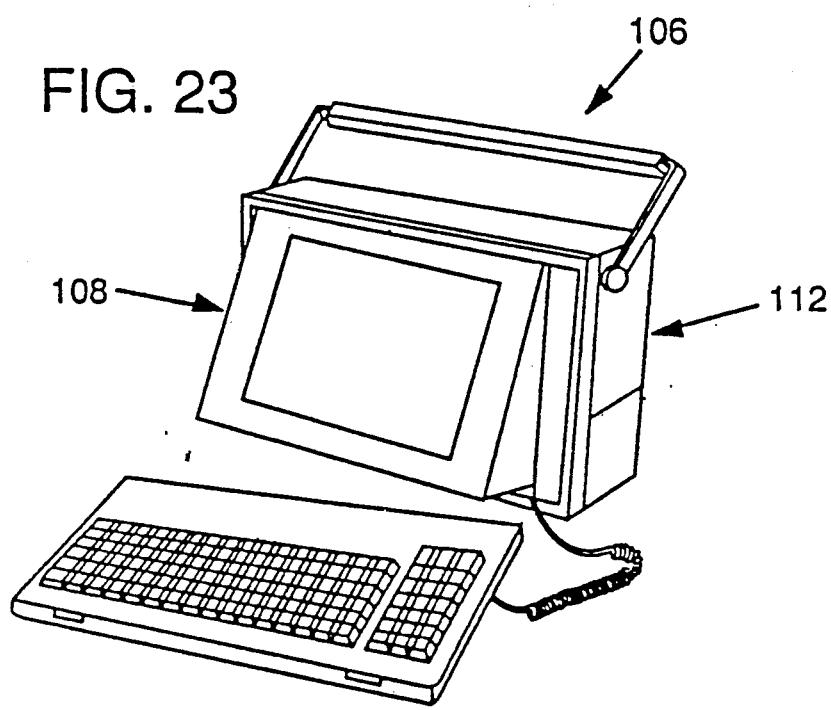
FIG. 24
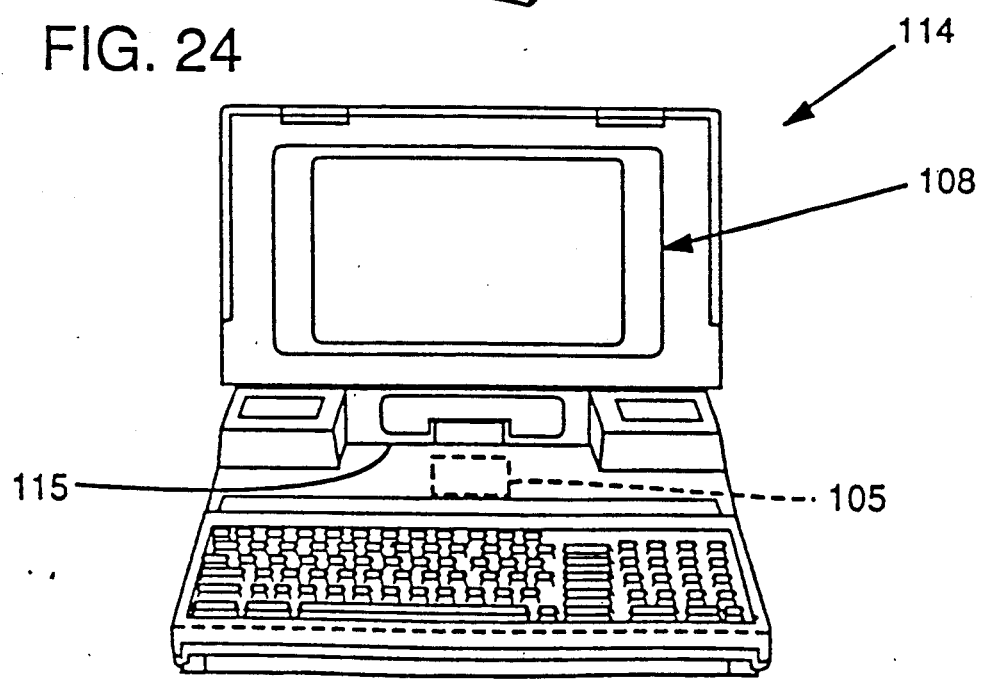

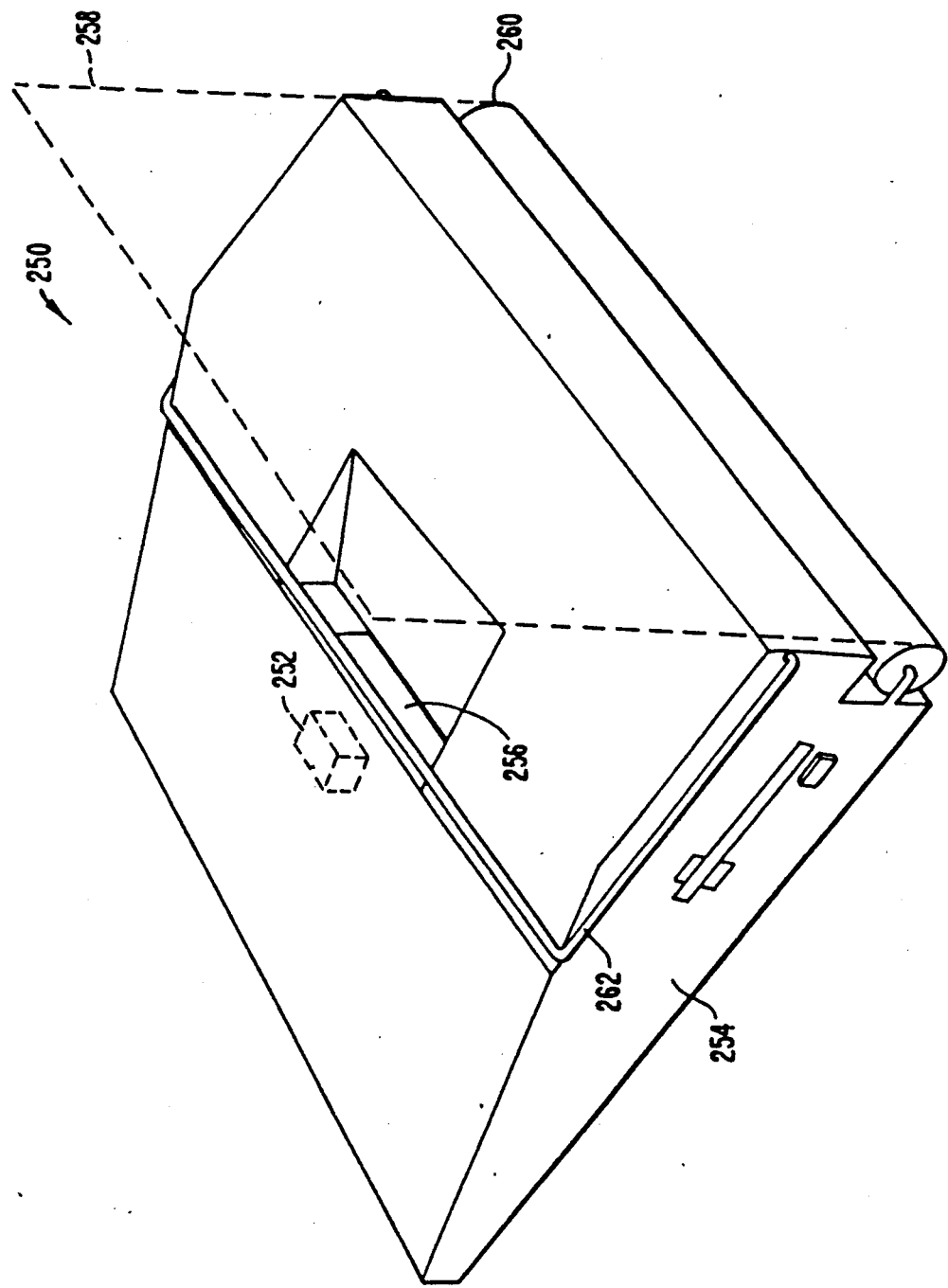
FIG.__34.

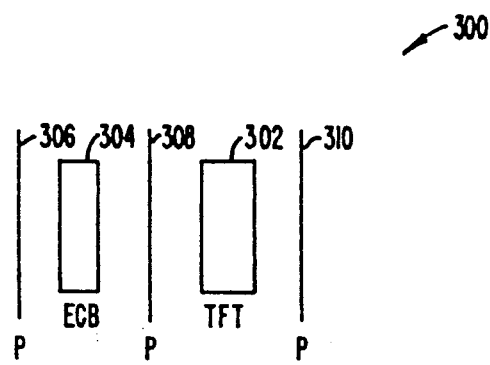
FIG._35.
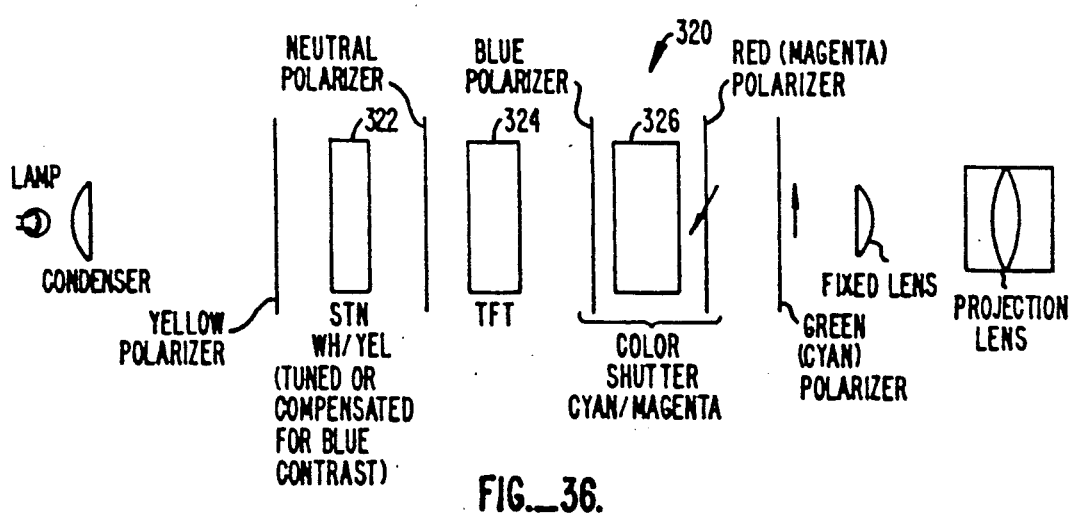
FIG._36.

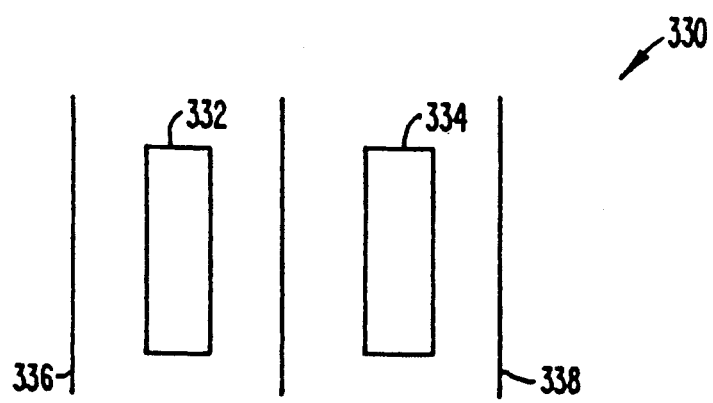
FIG._37.
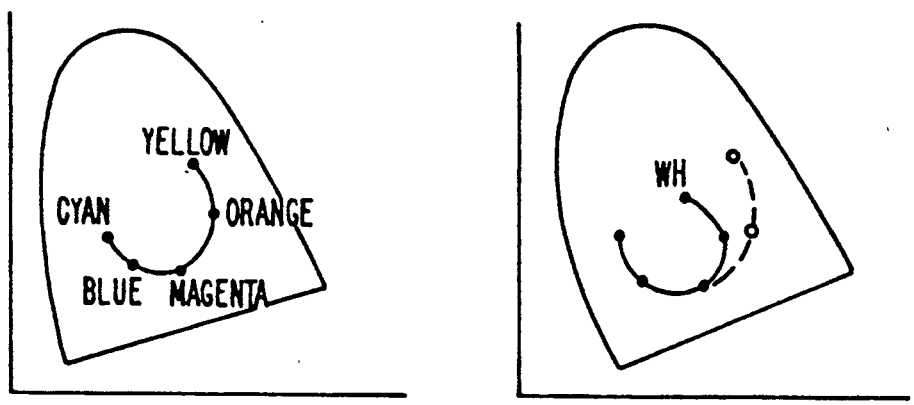
FIG._38.          FIG._39.
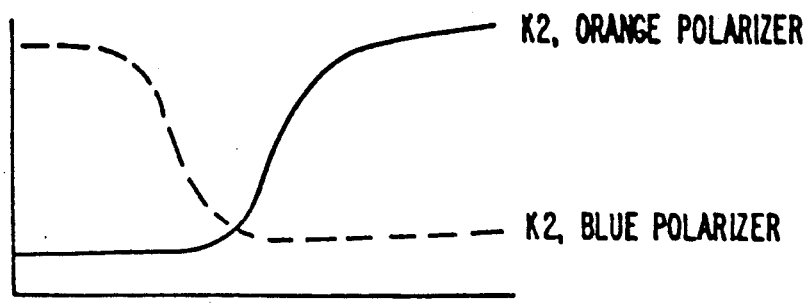
FIG._40.

COLOR DISPLAY USING SUPERTWISTED NEMATIC LIQUID CRYSTAL MATERIAL

RELATED APPLICATION DATA

The present invention is a continuation-in-part of copending application Ser. Nos. 07/402,134 filed Sept. 1, 1989, now U.S. Pat. No. 4,917,465, 07/378,997 filed July 12, 1989, now U.S. Pat. No. 4,952,036, 07/363,099 filed June 7, 1989, now U.S. Pat. No. 4,966,441, and 07/329,938 filed Mar. 28, 1989, now abandoned. These applications are assigned to the present assignee and are incorporated herein by reference.

FIELD OF THE INVENTION

The present invention relates to systems for displaying color images, and more particularly relates to such systems wherein the image is formed by passing light through a plurality of birefringent optical elements.

BACKGROUND AND SUMMARY OF THE INVENTION

Much effort has been made in recent years to develop low power color displays. Such efforts have generally employed LCD panels in one of three configurations. In the first configuration, a plurality of differently colored LCD panels are stacked and illuminated with white light. As the light passes through the stacked layers, pixels in each panel act as controllable color filters, selectively coloring the light exiting the display. U.S. Pat. No. 3,703,329 is representative of such systems and shows a stack of three panels, variously dyed to individually produce the colors yellow, cyan and magenta. Together the panels cooperate, using subtractive color, to produce all eight primary colors. A related system is shown in U.S. Pat. No. 4,416,514. In this system, differently dyed polarizers (yellow, magenta and cyan) are interposed in a series of twisted nematic cells. By varying the voltage applied to each cell, the twist angle of the liquid crystal molecules changes, imparting a variable rotation to the light exiting the cell. The colored polarizers cooperate with this controllably twisted light to select desired colors.

While such stacked cell systems can provide a full color display, they typically have certain drawbacks. One is parallax, inherent in any stacked optical system. Another is poor brightness, due to absorption of light by the dye in dyed cell systems, and due to blockage of cross polarized light by polarizers in systems that rely on polarization rotation to differentiate colors.

The second approach uses only a single LCD panel, but uses it in conjunction with a mosaic color filter. The mosaic filter typically has a plurality of red, green and blue filter elements, each aligned with a pixel in the LCD panel. By controlling the transmissivity of pixels in the LCD panel, the display can pass light through selected areas of the color mosaic filter.

While the color mosaic technique addresses certain shortcomings of the stacked panel approach, it introduces certain problems of its own. One is that brightness is limited because less than a third of the active pixel area transmits light for any given color.

Another shortcoming of the color mosaic approach is that pixel density must be increased by a factor of three to obtain the same resolution as the stacked cell approach. That is, to provide a color display with a horizontal resolution of 640 colored pixels, for example, the LCD panels must have 1920 pixels, 640 for each of the red, green and blue filter elements. This introduces fabrication problems that decrease yields and increase panel costs. Further, the finite width of the gap between pixels must remain, even though the pitch has decreased, so the actual pixel "aperture ratio" can be decreased dramatically. (Some small format thin film transistor (TFT) displays have a total open aperture area of only 45% of the total display surface due to row and column lines and transistor area, etc.)

The third approach is birefringence color. In such systems, the birefringent operating mode of certain material is exploited to produce color, as opposed to reliance on colored dyes in guest-host type cells or reliance on rotation of light through known twist angles in twisted nematic cells.

Birefringent color systems typically take two forms: those relying on passive birefringent layers to impart a birefringent effect to a liquid crystal cell (as shown in U.S. Pat. No. 4,232,948), and those in which the liquid crystal material itself exhibits a birefringent effect (sometimes called "electrically controlled birefringence" or "tunable birefringence"). In the latter instance, the degree of birefringence is a function of the voltage applied to the liquid crystal material. By switching the applied voltage to different values, different colors can be produced. Color displays relying on this principle are shown in U.S. Pat. Nos. 3,785,721, 3,915,554 and 4,044,546.

During recent years, so called "supertwisted" or "highly twisted" nematic cells have become popular in many applications. Such cells are described, inter alia, in U.S. Pat. Nos. 4,697,884 and 4,634,229, and in Scheffer et al, "A New, Highly Multiplexable Liquid Crystal Display," Appl. Phys. Lett. 45 (1), Nov. 15, 1984, pp. 1021-1023, and Kinugawa et al, "640×400 Pixel LCD Using Highly Twisted Birefringence Effect With Low Tilt Angle," 1986 SID Digest, pp. 122-125. The '884 and '229 patents are incorporated herein by reference.

Supertwisted nematic (STN) cells generally function in a birefringent mode. However, unlike earlier birefringent cells, STN cells exhibit a bistable behavior wherein they switch rapidly from a deselect state to a select state and back again as the excitation (RMS) voltage crosses a switching threshold. The select and deselect voltage regions can be made quite close to one another, such as 1.20 volts and 1.28 volts, permitting the cells to be multiplexed at high rates. FIG. 1 shows the transmission of a representative STN cell (with a particular polarizer orientation) as a function of applied voltage, illustrating the steepness of the switching function. Note that this curve shows the overall photopic "brightness" and does not reveal any coloration of the liquid crystal in the select and deselect states.

It is the multiplexibility of STN cells that makes them particularly desirable. This multiplexibility is achieved without active elements (i.e. drive transistors on each pixel, etc.) and without exotic alignment and liquid crystal operating modes (i.e. ferroelectric, phase-change, hysteresis, etc.). Thus, STN provides an inexpensive direct-multiplexed display type requiring only M+N drivers to operate a display comprised of M×N pixels.

There is an inverse-squared relationship between the number of display lines to be "addressed" and the difference between display "on" and "off" driving voltages (RMS average). As the number of display lines increases, the difference in driving voltage must decrease. To illustrate, a multiplex rate of 100:1 can be achieved with approximately a 10% difference in driving voltages, and a MUX rate of 240:1 can be achieved with approximately a 6% difference in driving voltages. Theoretically, arbitrarily high MUX rates can be achieved if the driving voltage difference is made small enough.

The main drawback to STN is the optical operating mode—birefringence. That is, the only way to distinguish pixels driven by the "on" voltage from those driven by the "off" voltage is the difference in birefringence between the two pixels. (As noted, for high information content displays, the difference in driving voltages is minute and decreases rapidly with an increase in the number of display lines that must be driven.) To distinguish the difference in pixel birefringence, polarizers are used—one to polarize the entering light to a known polarization, and one to select only one polarization of exiting light for examination. Depending on the state of the pixels, the light oriented to pass through the exit polarizer will be one of two colors. For best contrast, the polarizers are usually arranged so that these two colors are yellow and blue. (Actually, only one color can be selected by orientation of the polarizers—and this color can only be selected from a relatively small spectrum of colors. There is very little design freedom in varying the color in the second state—it is essentially a function of the first color.)

FIG. 2 shows the transmission characteristics of a representative yellow/blue mode STN cell (with associated polarizers) when the cell is in its select and deselect states. As can be seen, when the cell is "selected" (by applying an excitation voltage of 1.56 volts), the transmission spectrum has a maximum at 400 nanometers, a minimum at 600 nanometers, and an intermediate value at 500 nanometers. When the cell is "deselected" (by reducing the excitation voltage to 1.41 volts), the transmission spectrum includes a null at 400 nanometers, a maximum at 500 nanometers, and an intermediate value at 600 nanometers. Light exiting the cell/polarizer combination in the select state is thus principally blue, and light exiting in the deselect state is green plus yellow plus red, which appears as yellow to the human observer.

Unlike TN cells and cells operating in other modes, a birefringent STN cell cannot be operated in a black/white mode. The reason is that black requires all wavelengths of light to be linearly cross-polarized with the exit polarizer to effect complete light blockage, and true white requires all wavelengths of light to be linearly polarized parallel with the exit polarizer to effect complete light passage. The birefringent operating mode, by definition, prevents such results since different wavelengths of light are polarized differently during passage through the material. Thus, STN cells are unavoidably colored. However, this drawback has been tolerated in order to achieve the high multiplexibility that STN provides.

In order to eliminate the birefringence color, some manufacturers have incorporated various compensation layers in display assemblies. One such compensation layer is a second birefringent cell of opposite twist than the first to counteract the wavelength dependence in the cell's behavior. Another type of compensation layer, sometimes used in conjunction with the above-mentioned blue/yellow mode STN LCDs, is a polarizer that has been dyed to pass cross-polarized light in the blue and red portions of the spectrum in order to make the yellow state of the LCD "whiter." This still yields a blue/white LCD, instead of the desired black/white. However, this color limitation is usually accepted in order to achieve the high multiplex ratio.

While the birefringence of STN cells unavoidably produces colors, the colors so produced are generally considered too limited in range and too inferior in quality to be suitable for use in color displays. Far preferred are the rich colors that can be achieved with guest-host cells, or TN cells with dyed filters.

In accordance with the present invention, a color display system is formed by operating a plurality of birefringent cells in cooperation with one or more colored polarizers, thereby complementing and correcting the birefringence colors and yielding a brighter display.

In a preferred embodiment, a plurality of STN birefringent panels are tuned to different subtractive primary colors (i.e. yellow, cyan and magenta) and stacked. Interposed between the panels, and sandwiched about the stack, are polarizers, at least one of which is colored. In some embodiments, this assembly is illuminated by a collimated light source and the resulting image is focused onto a projection screen for viewing. In other embodiments, optics are provided to permit direct wide angle viewing of the display without parallax effects.

The foregoing and additional features and advantages of the present invention will be more readily apparent from the following detailed description, which proceeds with reference to the accompanying drawings.

BRIEF DESCRIPTION OF THE DRAWINGS

FIG. 23 shows a portable computer employing a direct view display according to the present invention.

FIG. 24 shows a laptop computer employing a direct view display according to the present invention.

FIG. 34 shows a computer with a roll-up screen according to the present invention.

FIG. 35 shows a display subassembly using a thin film transistor (TFT) LCD panel in conjunction with an STN panel.

FIG. 36 shows a display subassembly using a TFT panel, an STN panel, and a color shutter.

FIG. 37 shows a display subassembly using two panels.

FIG. 38 illustrates a possible color gamut produced by one of the panels of FIG. 37.

FIG. 39 illustrates the gamut of FIG. 38 after being analyzed with a blue polarizer.

FIG. 40 illustrates the spectral characteristics of two possible polarizers used in the display subassembly of FIG. 37.

DETAILED DESCRIPTION

Figure 1:
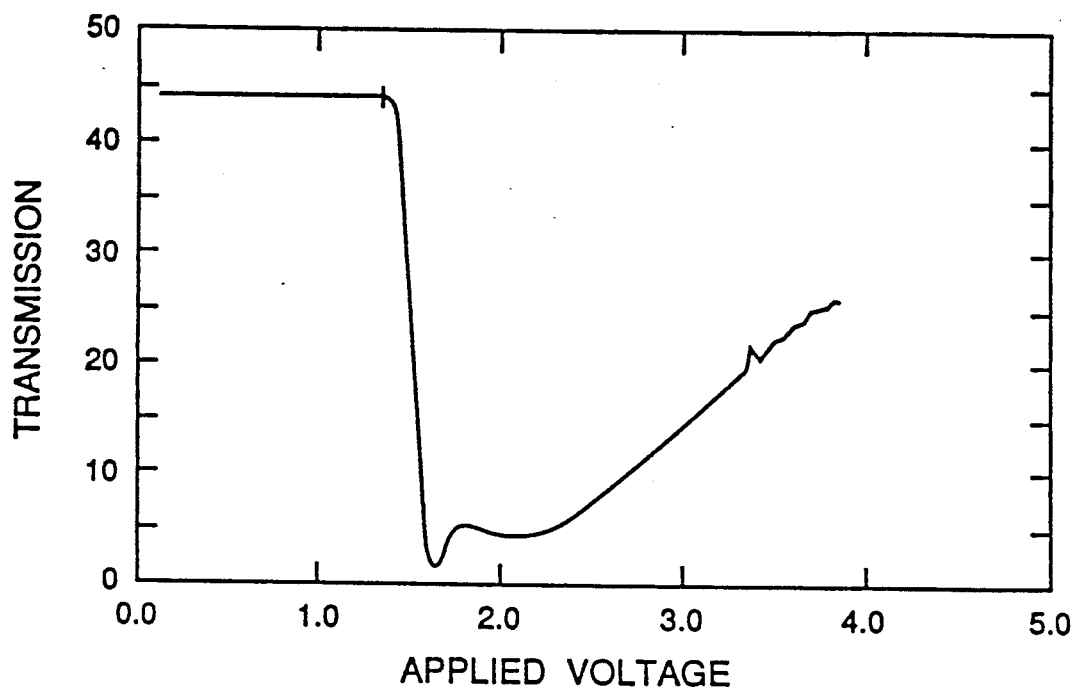
FIG. 1 shows the transmission characteristics of a representative STN cell as a function of applied voltage.

To provide an enabling disclosure without unduly lengthening this specification, applicants incorporate by reference the disclosures of U.S. Pat. Nos. 4,549,174, 4,652,101, 4,709,990, 4,763,993 and 4,832,461 which teach certain concepts useful in the construction of a device according to the present invention.

Before proceeding, it may be helpful to first review certain principles of color optics. The primary light colors are generally considered to be red, green and blue. White light is composed of all three primaries. White light with red filtered therefrom (i.e. removed) is termed cyan; white light with green filtered therefrom is termed magenta; and white light with blue filtered therefrom is termed yellow. These latter colors, cyan, magenta and yellow, are sometimes termed subtractive primary colors, since they denote the absence of one of the primary colors.

Filters selectively attenuate (or "absorb") light of certain colors and pass light of other colors relatively unattenuated. A red filter, for example, attenuates blue and green light and lets red light pass. Similarly, a blue filter attenuates red and green light and lets blue light pass. Finally, a green filter attenuates red and blue light and lets green light pass. Filters of the primary colors thus subtract two primary colors and let the third pass.

Filters of the subtractive primary colors subtract one primary color and let the two others pass. For example, a cyan filter attenuates red light and lets blue and green light pass. Similarly, a magenta filter attenuates green light and lets blue and red light pass. Finally, a yellow filter attenuates blue light and lets green and red light pass.

These properties are summarized in Table I.

TABLE I

| Filter | Absorbs | Passes |
|---|---|---|
| Red | Green, Blue | Red |
| Green | Red, Blue | Green |
| Blue | Red, Green | Blue |
| Yellow | Blue | Green, Red |
| Cyan | Red | Blue, Green |
| Magenta | Green | Blue, Red |

Again, although somewhat counter-intuitive, it should be remembered that a blue filter does not absorb blue light. It passes blue light and blocks light of other colors.

It should further be noted that the human eye is more sensitive to certain wavelengths of light than to others. The eye's normal daytime response (termed "photopic" response) typically peaks at about 554 nanometers and diminishes to near negligible values around 400 and 700 nanometers.

For convenience of discussion, the optical spectrum is generally segregated into the red, green and blue portions by dividing lines at 500 and 600 nanometers. (For physiological reasons, a precise dividing line cannot be defined.) Using these boundaries, the human eye perceives 55% of the energy in white light from the green portion of the spectrum (500 to 600 nm.), 30% from the red portion (above 600 nm.), and only 15% from the blue portion (below 500 nm.). Perfect green, red and blue filters thus transmit 55%, 30% and 15% of white light, respectively (photopically). Since yellow, cyan and magenta are combinations of these colors, it can be seen that perfect yellow, cyan and magenta filters transmit 85%, 70% and 45% of white light, respectively.

The LCD panels used in the illustrated embodiments are supertwisted nematic LCD panels that are controllably colored by exploitation of the birefringence effect. As mentioned in the Background discussion, birefringence is an optical phenomenon in which light oriented along one axis of the material propagates at a different speed than light oriented along another axis. This asymmetry results in different wavelengths of light having different polarizations when they exit the material. Polarizers can be used to analyze the elliptically polarized light exiting the panel to select colors. Prior art uses of birefringence to control color in LCD panels are discussed in U.S. Pat. Nos. 3,876,287, 4,097,128, 4,127,322, 4,394,069, 4,759,612 and 4,786,146, the disclosures of which are incorporated by reference.

Display Subassembly

Figure 3:
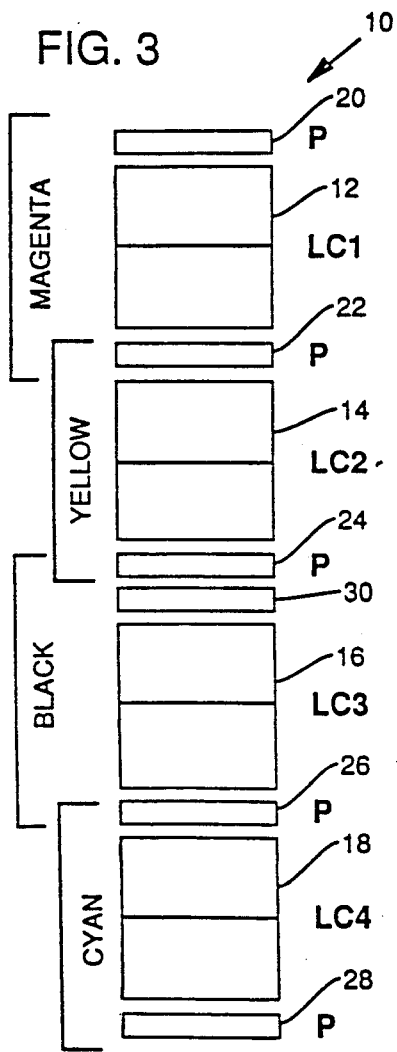
FIG. 3 is a schematic diagram of a display subassembly according to one embodiment of the present invention.

Turning now to FIG. 3, there is shown a basic display subassembly 10 according to one embodiment of the present invention. The illustrated subassembly includes four LCD panels 12, 14, 16, 18 sandwiched alternately between five polarizers 20, 22, 24, 26 and 28. An optional retardation film layer 30 is also shown.

In the illustrated subassembly 10, the birefringent properties of the panels 12-18 are "tuned" (by choosing the thickness (d) of the liquid crystal layer and its optical refractive index anistropy ($\Delta n$)) to yield a desired coloration. For example, the birefringent properties of the first panel 12 are tuned so that incoming green light (which has been polarized by the entrance polarizer 20) propagates through the liquid crystal material in such a manner that the orientation of its principal axis upon leaving the cell is orthogonal to the exiting polarizer 22 when the panel 12 is in its deselected (i.e. deenergized) state. The panel 12 and polarizers 20 and 22 thus act as a magenta filter when the panel is deselected. The tuning of panel 12, and the orientations of the associated polarizers, are also selected so that, when the panel is in its selected (i.e. energized) state, green light is passed, together with red and blue light, to yield a substantially "white" color. (For expository convenience, panel 12 is sometimes called the "magenta" panel and is said to controllably absorb green light. It will be recognized, however, that this and the other panels must be operated in conjunction with associated front and back polarizers to achieve the desired coloring effect.)

The illustrated second panel 14 is similarly tuned to operate as a yellow filter (i.e. absorbing blue) when in its deselected state and to pass all wavelengths of light (i.e. white light) when in its selected state. It is sometimes termed the "yellow" panel. The illustrated fourth panel 18 is similarly tuned to operate as a cyan filter.

The illustrated third panel 16 is an optional "black" panel that may be included to increase contrast. Its construction may take any of a number of forms, as discussed below.

As mentioned earlier, it is the thickness (d) of the liquid crystal layer and its optical refractive index anistropy ($\Delta n$) that principally determine each panel's spectral response for a given twist angle $\Psi$. While the panel's response is determined by a complex formula, the response can be roughly approximated as dependent on the ratio $\Delta nd/\Psi$. In the illustrated embodiment, these ratios have the values shown in Table II:

TABLE II

| Panel | $\Delta nd/\Psi$ | $\Psi$ |
| --- | --- | --- |
| Magenta | 0.19 | 4.19 (rad.) |
| Yellow | 0.23 | 3.84 |
| Cyan | 0.25 | 4.19 |

It will be recognized that the $\Delta nd/\Psi$ ratios referenced in Table II can be achieved with any number of cell thicknesses. The choice of cell thickness is a tradeoff between several factors, including the panel's response time and uniformity. The response time of the panel generally increases with the panel thickness. Consequently, to achieve a fast response time, it is desirable to use a thin panel. However, as the cell thickness decreases, small fabrication errors, such as a $1\mu$ change in cell thickness over the width of a panel, yields a relatively large variation in panel color behavior and switching threshold voltage. To insure color uniformity, it is desirable to use a thick panel so fabrication errors are kept to a small percentage of the total liquid crystal thickness. As a compromise between these considerations, a cell thickness of 6 to $12\mu$ may be used.

Figure 4:
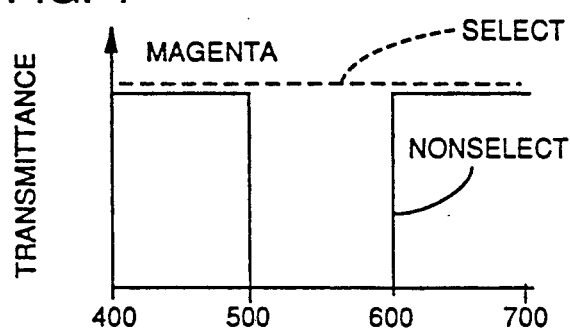
FIGS. 4-6 are spectral photometer plots showing ideal light transmission characteristics for three liquid crystal panels used in the display subassembly of FIG. 3 when in their selected and deselected states.
Figure 5:
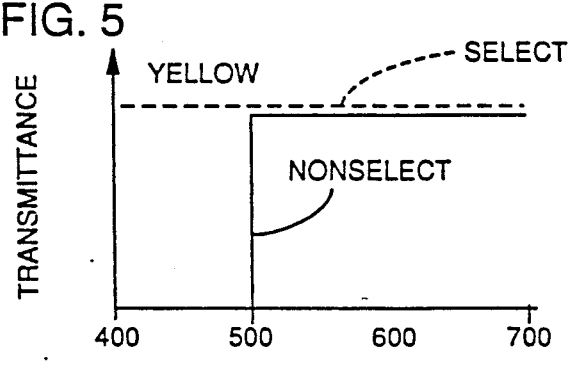
Figure 6:
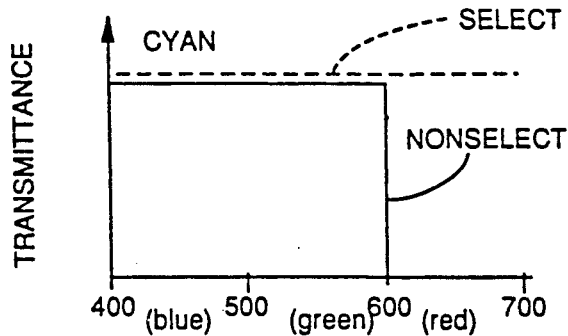
Figure 7:
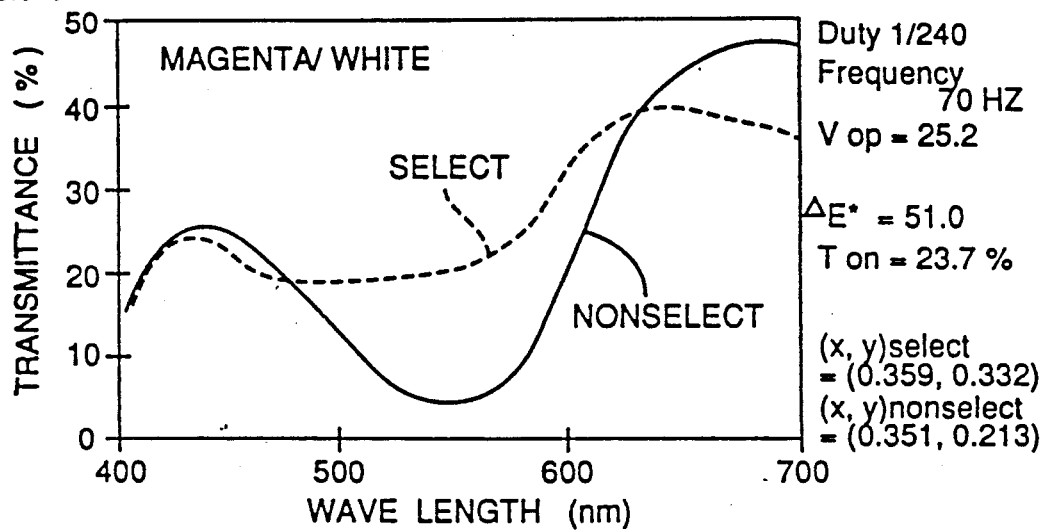
FIGS. 7-9 are spectral photometer plots showing the actual light transmission characteristics of three Kyocera liquid crystal panels used in the display subassembly of FIG. 3 when in their selected and deselected states.
Figure 8:
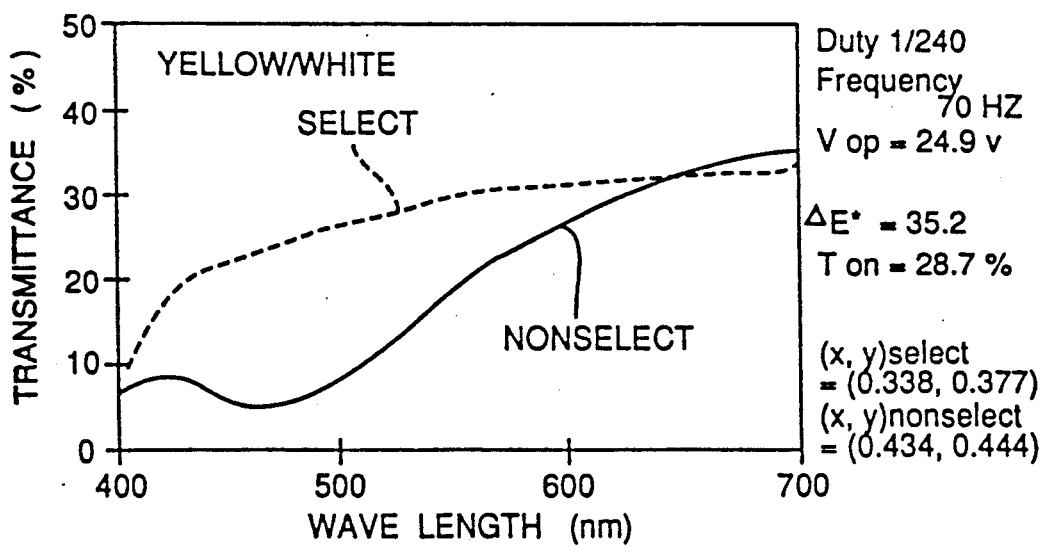
Figure 9:
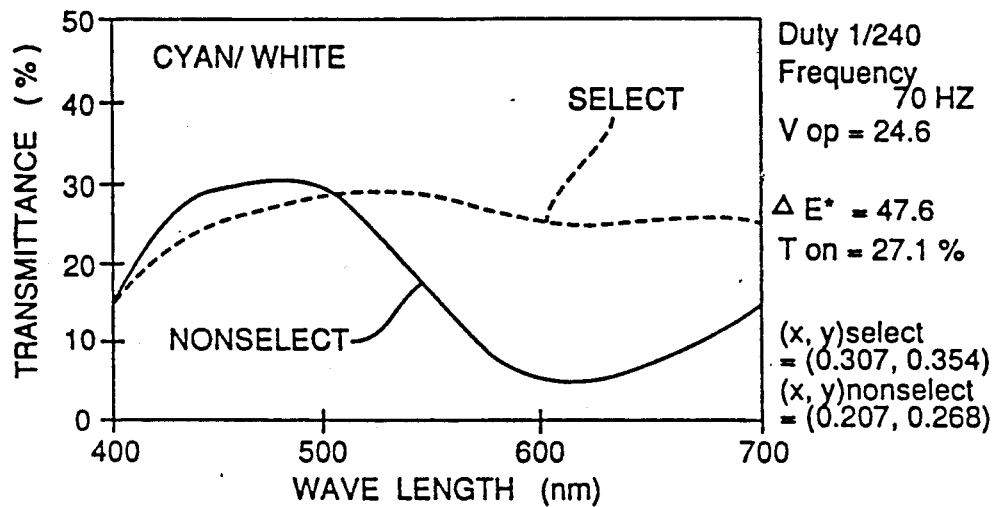
Figure 10:
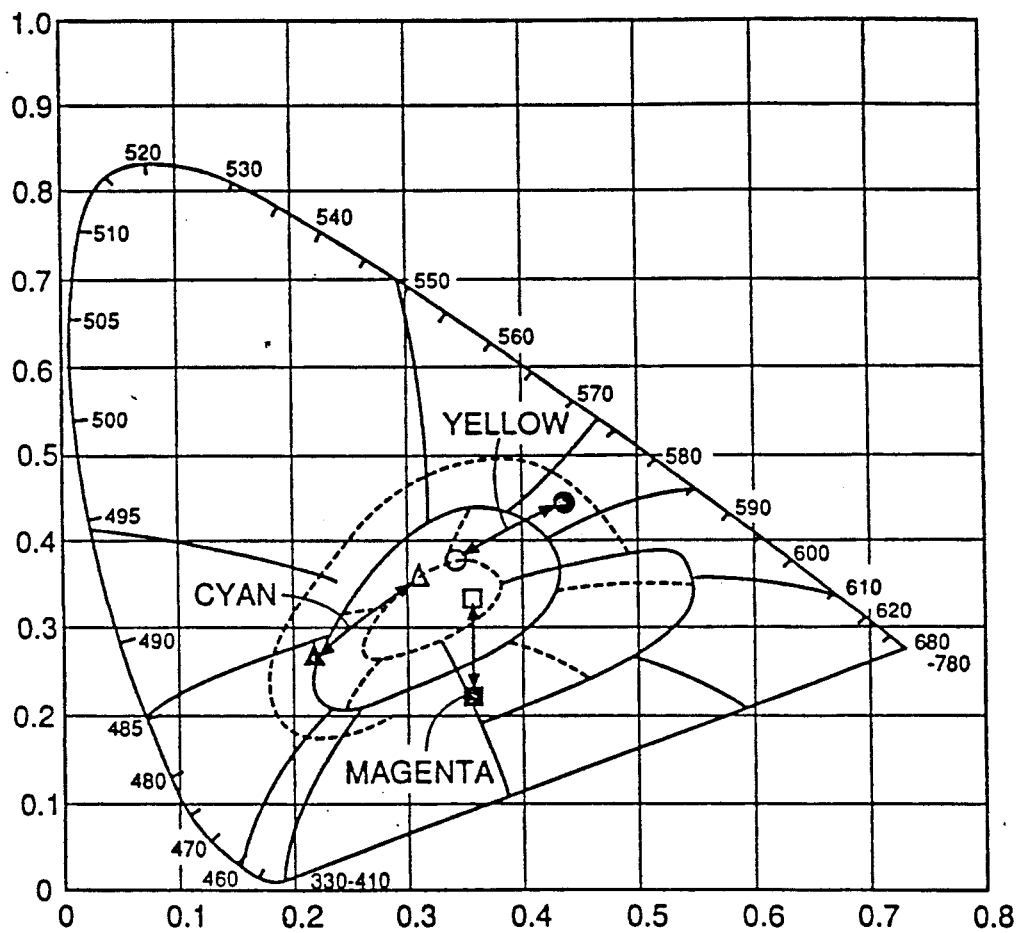
FIG. 10 is a chromaticity diagram illustrating the performance of the Kyocera panels when in their selected and deselected states.

Spectral photometer plots showing the light transmission qualities of ideal panels 12, 14 and 18 (again, considered in conjunction with their associated polarizers) are provided in FIGS. 4, 5 and 6, respectively. Panels suitable for use as panels 12, 14 and 18 are available from Kyocera of Hayato, Japan as part numbers KC-6448ASTP-SC-M, KC-6448ASTP-SC-Y and KC-6448ASTP-SC-C, respectively, or may be fabricated using known techniques. Spectral photometer plots showing the actual behavior of the Kyocera panels are provided in FIGS. 7-9. The plot for the magenta panel in FIG. 7 was made with a red entrance polarizer. The plot for the cyan panel in FIG. 9 was made with a blue exit polarizer. (As can be seen from these curves, neither the passage of light of the desired color nor the attenuation of light of undesired colors is perfect, but the resulting effect is more than adequate to provide saturated colors throughout the human visual area.) A chromaticity diagram illustrating performance of the Kyocera panels in their selected and deselected states is provided in FIG. 10.

Each of panels 12-18 comprises a plurality of pixels that can be individually energized to change the spectral distribution of the light that is permitted to pass therethrough. By selecting corresponding pixels in the three colored panels, light of any color can be transmitted through the display subassembly 10. To transmit a pixel of green light, for example, a pixel in the yellow panel 14 is deselected to absorb blue light and the correspondingly positioned pixel in the cyan panel 18 is deselected to absorb red light. By superimposing the spectral transmission curves of these two pixels, it will be recognized that the remaining, transmitted light has a peak in the region of the spectrum the eye perceives as green. (The magenta panel 12 is left selected (i.e. white transmitting) in this example and thus has no relevant filtering effect.)

Figure 11:
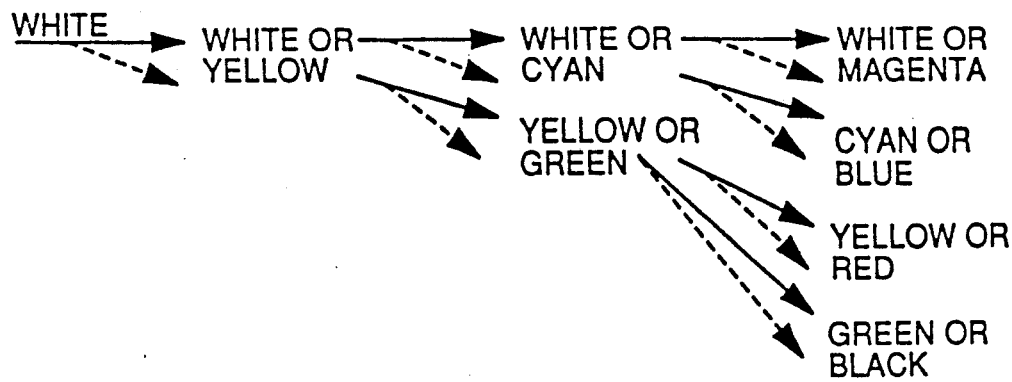
FIG. 11 is a diagram showing the eight basic colors achieved by operating yellow, cyan and magenta panels in their various combinations.

The color blue can be similarly achieved by deselecting corresponding pixels in the cyan and magenta panels, and red can be achieved by deselecting corresponding pixels in the yellow and magenta panels. If it is desired to absorb all light and thus produce a black pixel on the image plane, pixels in all three panels are deselected. FIG. 11 shows the eight basic colors achieved by operating a yellow/cyan/magenta series of panels in their various combinations.

Polarizers are needed to analyze the light passing through the liquid crystal panels in order to achieve perceptible contrast. In prior art systems, the polarizers are typically neutral (i.e., dyed black by iodine). In the present invention, colored polarizers (which are "leaky") can be used in certain positions to pass more light, improving the brightness and allowing color balance improvements.

The first panel 12 is illustrated as being "magenta." Light entering it is polarized by the first polarizer 20. Normally, all colors of light orthogonal to the axis of polarizer 20 would be absorbed by the black dye of a conventional, neutral polarizer, resulting in an immediate loss of 50% (theoretical) of the light. (In actual practice, the loss of a neutral polarizer is about 55-58%.) This loss can be cut dramatically if the first polarizer is dyed magenta. Such a polarizer still passes the white light parallel to the polarizer's axis, but additionally passes blue and red light orthogonal to its axis. This additional blue and red light is permitted to pass further into the display subassembly and ultimately contributes to the overall brightness of the resulting display, instead of being absorbed by the first polarizer as is normally the case. The losses normally associated with this first polarizer are thus cut by about two thirds. Display brightness improves commensurately.

(In an alternative embodiment, the entrance polarizer 20 may be dyed red. While theoretically not as advantageous as a magenta polarizer, a red polarizer is easier to realize and still offers a substantial improvement in brightness, passing about 59% of the incident light, as opposed to 45% or less for a neutral polarizer.)

The same benefit can be achieved at the exiting end of the sandwiched display subassembly 10. The last panel 18 in the subassembly is illustrated as being cyan. By dying the polarizer 28 adjacent thereto cyan, the blue and green light that would normally be absorbed thereby is allowed to leak through and pass out of the display subassembly, again improving display brightness.

(Again, the exit polarizer 28 may be dyed blue instead of cyan. A blue polarizer passes about 56% of the incident light, still yielding a significant improvement in brightness over a neutral polarizer.)

Conventional neutral polarizers can be used at the positions (22, 24, 26) intermediate the liquid crystal panels and a significant improvement in display brightness is still achieved by virtue of the two colored polarizers described above. The use of neutral intermediate polarizers also assures that there is no birefringence interaction between panels (i.e. the deselected or selected nature of the Δnd of the center panel makes no difference to the passage of light and total birefringence of the adjacent panels).

In other embodiments, the polarizers at the intermediate positions in the subassembly may be colored. Care must be taken, however, not to interfere with the color-selective properties of the birefringent panels. For example, if a yellow colored polarizer is interposed between the magenta and yellow panels 12, 14, it will interfere with the color-selective properties of the magenta panel. As noted, the magenta panel itself does not absorb the undesired green light. Instead, its birefringence is tuned so that light propagating through the panel exits with the axis of its principal green component oriented orthogonally to the polarizer 22, causing it to be blocked. If this polarizer 22 is colored yellow, it will leak green and red light, including the green light that is meant to be blocked. Consequently, use of a yellow polarizer between the magenta and yellow panels defeats the careful tuning of the first panel's birefringence.

An equally poor color choice for the first intermediate polarizer 22 is magenta. A magenta polarizer would permit blue and red light to enter the yellow panel 14 at an unexpected orientation. The yellow panel was tuned so that blue light entering at a known polarization would propagate and exit with a principal polarization that would be blocked by the exiting polarizer 24. If the blue light enters the yellow panel 14 at an unexpected orientation, it will exit at an unexpected orientation and will not be blocked by the exiting polarizer. Consequently, use of a magenta colored polarizer 22 defeats the careful tuning of the yellow panel's birefringence.

Polarizer 22 should be colored, if at all, a color that both of the adjoining panels are intended to pass. In this case, since the magenta panel is intended to pass blue and red, and the yellow panel 14 is intended to pass green and red, the polarizer 22 should be colored the common color: red.

If the black panel 16 is omitted (together with associated retardation film 30 and polarizer 26), similar logic would dictate that the polarizer 24 between the remaining yellow and cyan panels should be colored, if anything, green.

In embodiments including a black/white panel, such as panel 16 in FIG. 3, the polarizers positioned adjacent thereto should be neutral (i.e. not colored) since any polarizer coloring would permit the black panel to leak light—an undesired effect.

To optimize display brightness, the dyed polarizers should exhibit a high degree of transmissivity to cross-polarized light in their "leaky" portion of the spectrum. In the illustrated embodiment, the polarizers each comprise a dyed 5 mil sheet of stretched polyvinyl alcohol. Table III specifies suitable dichroic dyes, which are available under various brand names from Crompton & Knowles, Atlantic, Ciba-Geigy and a variety of other dye suppliers.

TABLE III

| POLARIZER | DYE |
|---|---|
| Magenta | Direct Red #81 |
| Yellow | Direct Yellow #18 |
| Cyan | Direct Blue #1 |

The foregoing discussion has described only one of many possible sequences of polarizers and panels. Others can be devised. For example, while the first polarizer 20 in the above example has been described as being magenta in order to achieve an improvement in brightness, an alternative embodiment with the same sequence of LCDs can here use a blue or red polarizer instead. A blue or red polarizer still provides some improvement in brightness since it leaks light that would be absorbed by a black polarizer. Of course, a black polarizer can also be used if desired. The basic LCD sequence itself can also be varied with corresponding changes in the associated polarizers. The basic sequences are set forth in Table IV:

TABLE IV

| POL1 | LCD1 | POL2 | LCD2 | POL3 | LCD3 | POL4 |
|---|---|---|---|---|---|---|
| Y/G/R/K | Y | G/K | C | B/K | M | M/R/B/K |
| M/R/B/K | M | R/K | Y | G/K | C | C/4/B/K |
| Y/G/R/K | Y | R/K | M | B/K | C | C/G/B/K | where Y is yellow, K is black, G is green, C is cyan, B is blue, M is magenta and R is red.

Figure 12:
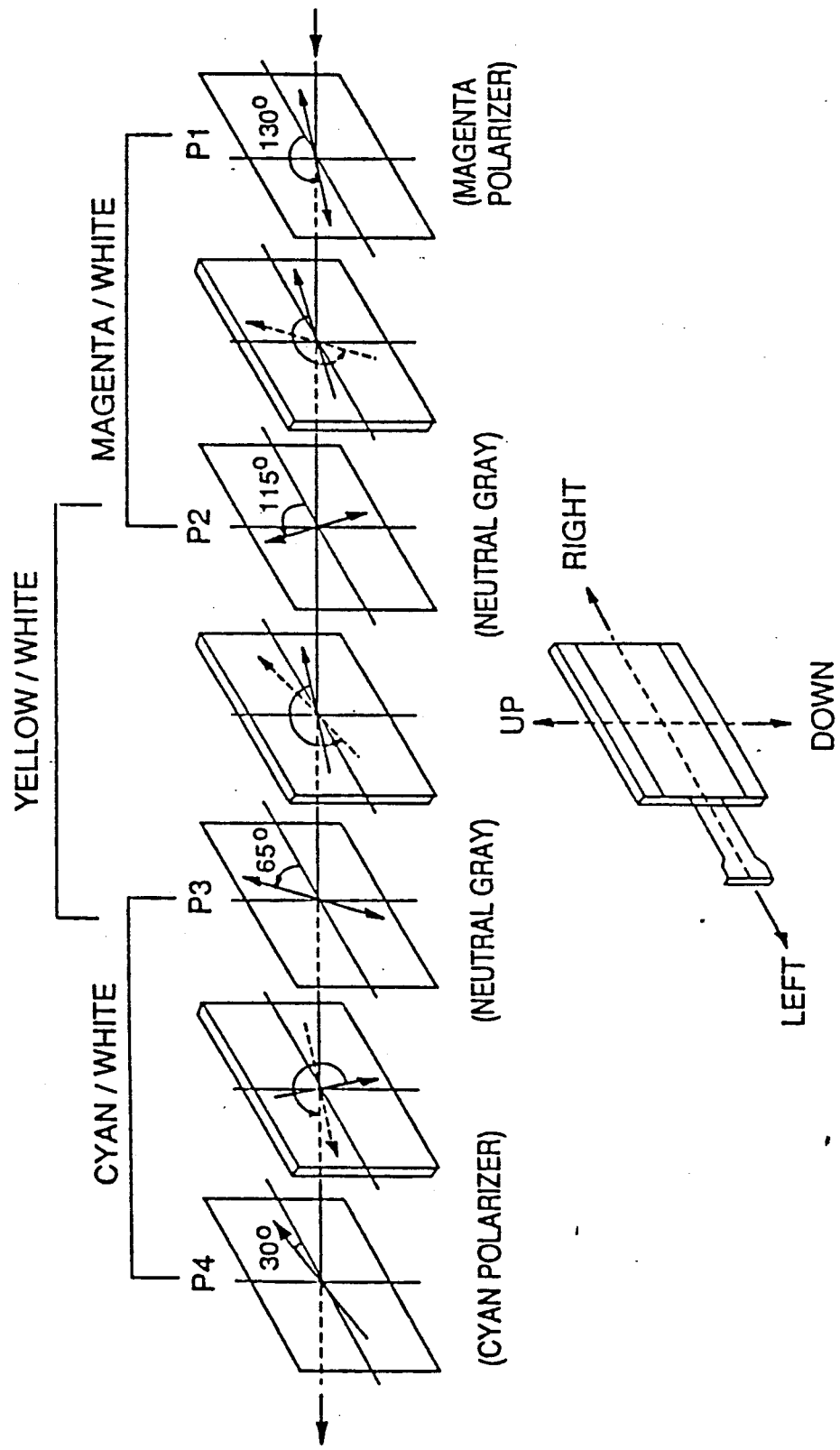
FIG. 12 details the construction of a display assembly incorporating three panels according to the present invention.

FIG. 12 illustrates in greater detail a display subassembly using just the magenta, yellow and cyan panels. The polarizers are magenta, black, black and cyan, respectively. Included in FIG. 12 are details of the relative alignment of the component panels and polarizers in an implementation using the Kyocera panels. The alignment angles are typically specified by the manufacturer and depend, inter alia, on the rubbing angles of the front and rear panel plates, the twist of the LCD molecules, and on various boundary layer phenomena associated with the liquid crystal material.

As noted, such a three panel subassembly can produce the color "black" (the absence of light) by deselecting each panel. Since the light passing through the subassembly is progressively stripped of its green, blue and red components, theoretically no light exits the subassembly. As a practical matter, however, the imperfect responses of the three panels permit some light of various colors to leak through at an attenuated level. The net result is a dark brown or grey color. While such an arrangement yields a contrast ratio of approximately 10:1—more than adequate for many applications—some applications require contrast ratios on the order of 100:1. To achieve such ratios, a fourth panel, such as the "black" panel 16 illustrated in FIG. 3, may be included in the subassembly. The characteristics of the black panel may be optimized for the intended application.

In one application, namely digital computer graphics using the RGBI standard, an "intensity" signal is used to differentiate each of the eight basic colors used in RGB systems into two colors, yielding a total of 16 colors. In such application, the black cell is optimized for maximum transmission when in the selected state. The contrast provided by the cell is of lesser importance. That is, a contrast range of 2:1, or even 1.5:1, will suffice to distinguish the 16 colors of the RGBI system.

In contrast, "full color" systems (i.e. television or high quality color computer graphics) require high contrast. To achieve the 256 or more colors that such systems require, an overall contrast ratio of 100:1 may be needed. Since the basic magenta/yellow/cyan (M/Y/C) subassembly delivers only a 10:1 contrast ratio, the black panel must provide a 10:1 ratio on its own. Thus, it must be optimized for blackest black. By cascading the two systems (M/Y/C and black), the contrast figures are multiplied, producing 100:1 overall white to black contrast, and allowing excellent grey shading and range of color. Of course, highly saturated primary colors still require M/Y/C contrast, but the black panel provides greater depth in the shadows and details in the highlights.

In the illustrated embodiment, the black panel 16 is a supertwisted nematic cell operated in conjunction with a retardation film 30 that tunes the cell for maximum contrast. In other embodiments, a double supertwisted nematic cell or even a twisted nematic cell may be used.

In actual practice, the "black" cell need not be black. A birefringent cell tuned to the blue end of the spectrum, for example, may be used since the human eye is relatively insensitive to blue light, yielding a relatively high photopic contrast ratio.

One advantage of the display subassembly of the present invention is the flexibility it affords in possible panel/polarizer sequences. If one sequence seems unworkable, a design can be optimized about another one. For example, if it is found that a good quality magenta polarizer cannot be obtained, then a design that does not require a magenta polarizer can be adopted.

It will be recognized that a display subassembly 10 according to the present invention can be used in a variety of applications, such as color projection systems and in direct view displays. A variety of such applications are detailed below.

Projection Systems

Figure 13:
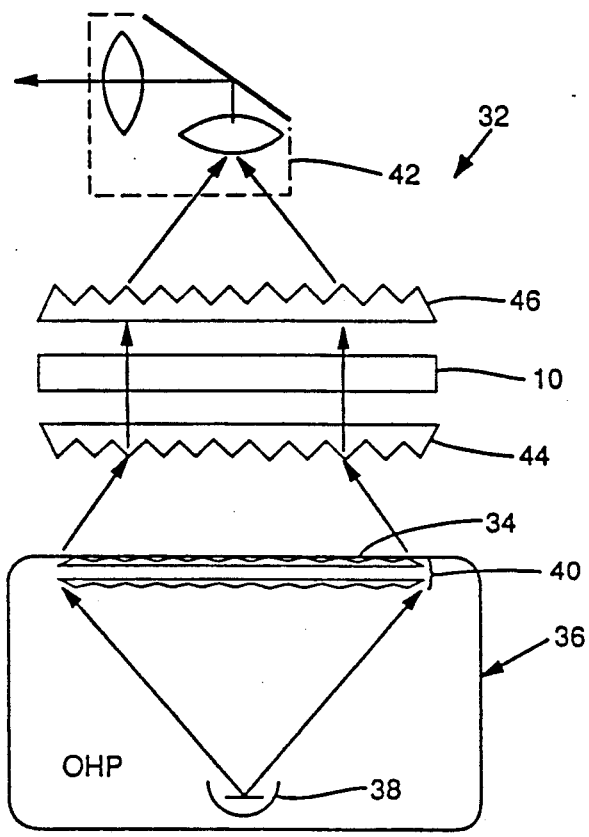
FIG. 13 shows a first projection system according to the present invention.

In a first projection system embodiment 32 of the invention, shown in FIG. 13, a display subassembly 10 is positioned on the transparent projection surface 34 of a conventional overhead projector 36. Such projectors typically include an illumination bulb 38 and a Fresnel lens 40 under the projection surface to produce light beams that pass through a transparency and converge onto a projection lens assembly 42. (Due to the short focal length and high power required of lens 40, it is often formed by cementing two or more lower powered Fresnel lenses together.)

Figure 14:
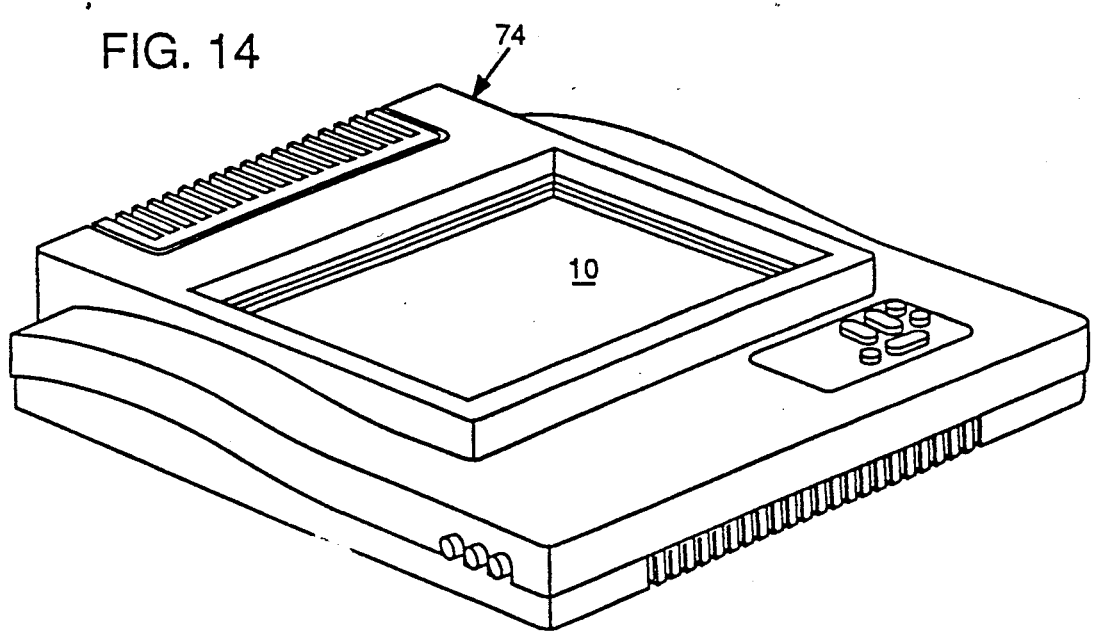
FIG. 14 is a perspective view of an integrated assembly including a display assembly and associated optics to facilitate use with an overhead projector.

When display subassembly 10 is used in such an embodiment, it is desirable to provide a Fresnel lens 44 to collimate the converging light from the projection surface 34 prior to illumination of the display subassembly. The light exiting the subassembly is then focused by a lens 46 (which is also desirably in Fresnel form) onto the projection lens assembly 42. (Lens 46 here serves the same purpose as the Fresnel lens 40 provided under the projection surface of the projector in the projector's normal operation, namely to focus light towards the projection lens assembly 42.) An integrated assembly 47 including both the display subassembly 10 and the Fresnel lenses 44, 46 is shown in FIG. 14.

Figure 15:
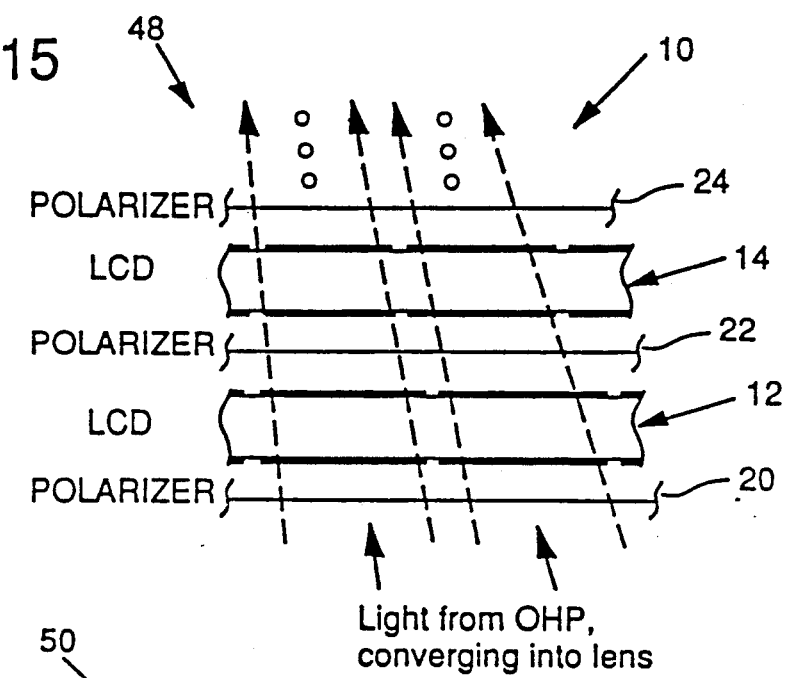
FIG. 15 shows a second projection system according to the present invention.

In a second projection system embodiment 48 of the invention, a portion of which is shown in FIG. 15, the collimating and focusing Fresnel lenses 44, 46 used in the FIG. 13 embodiment are omitted. Instead, the panels comprising the display subassembly are fabricated with different pixel spacings. The spacings on the various panels are selected so that corresponding pixels in the various panels are aligned with the converging light exiting the projection surface of the projector. By this arrangement, no accessory optics are required. Parallax effects are avoided since the internal optics of the display subassembly are designed to cooperate with the focused light used by the projector.

Figure 16:
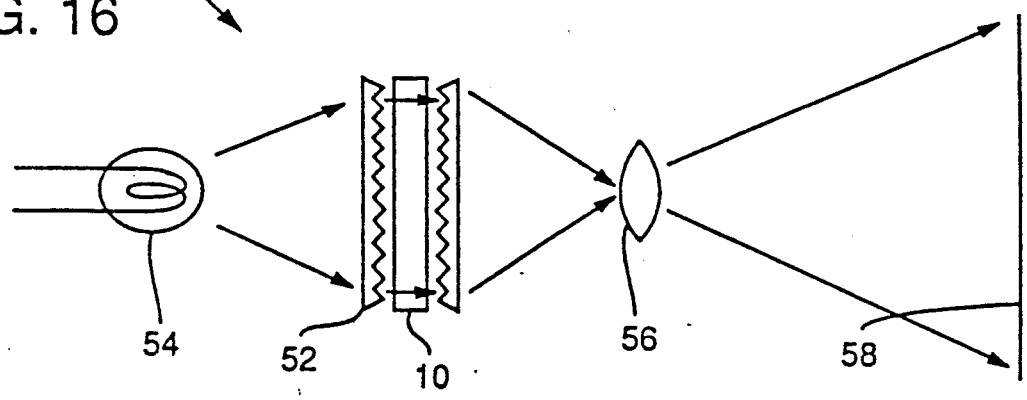
FIG. 16 shows a self contained color display using a display subassembly according to the present invention with associated projection optics.

Projection technology may also be used to provide a self contained display in which an image is projected onto the rear of a viewing screen. A color monitor for a computer may be realized in this fashion. One such arrangement 50 is shown in FIG. 16. In this embodiment, a field lens 52 is used to collimate the light from bulb 54 prior to its passage through the display subassembly 10. The resulting image is projected by a second lens 56 onto a translucent medium 58 which can then be viewed from the opposite side by a user.

Direct View Systems

A display subassembly 10 according to the present invention can also be incorporated into a number of direct view display systems, such as color graphics displays for portable or laptop computers.

In direct view displays, it is usually desirable to backlight the display with substantially collimated light. On the viewing side of the display, it is desirable to provide exit optics that permit a wide viewing angle without parallax effects.

Figure 17:
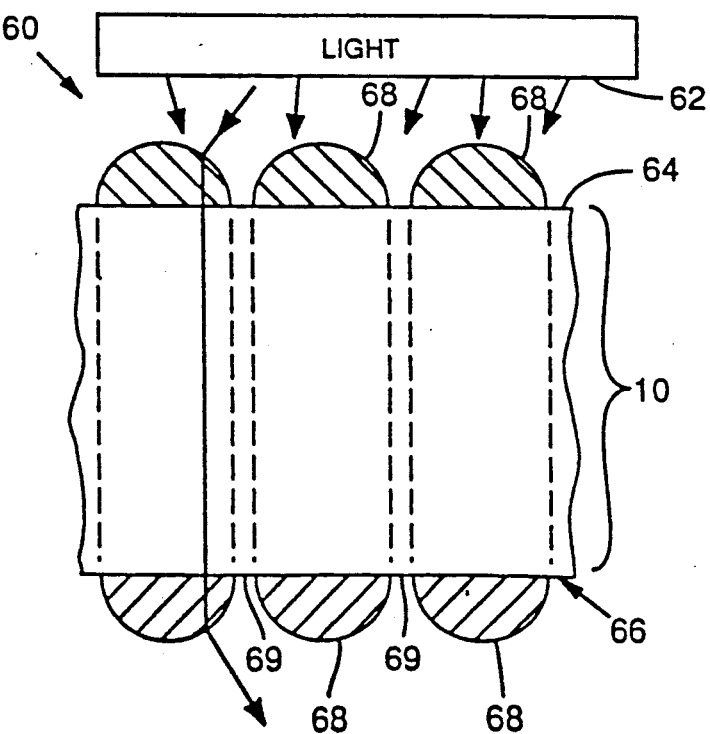
FIG. 17 shows a first direct view display system according to the present invention.

In a first direct view embodiment 60, shown in FIG. 17, the display subassembly 10 is backlit from a diffused light source, such as a fluorescent light panel 62. In such embodiment, entrance and exit optic elements 64, 66 generally collimate the diffuse light prior to entrance into the display subassembly and scatter the approximately-collimated light exiting the display. Each of optic elements 64, 66 may comprise a plate having formed thereon a plurality of microlenses 68, one aligned to each pixel. Light incident on one of the microlenses on element 64 is directed substantially normal to the plane of the subassembly and thus passes through the pixels of the component panels in the proper alignment, regardless of its initial orientation. Collimated light exiting the subassembly 10 is dispersed by the microlenses on the exit optic element 66, thereby permitting the color image to be viewed from a wide range of angles without parallax effects. The interstitial areas 69 between the lenses on exit optic 66 may be colored black to minimize stray light and to improve perceived contrast.

In other versions of the FIG. 17 embodiment 60, the arrays of microlenses can be replaced by arrays of fiber optic collimator faceplates or lenticular lenses.

Figure 18:
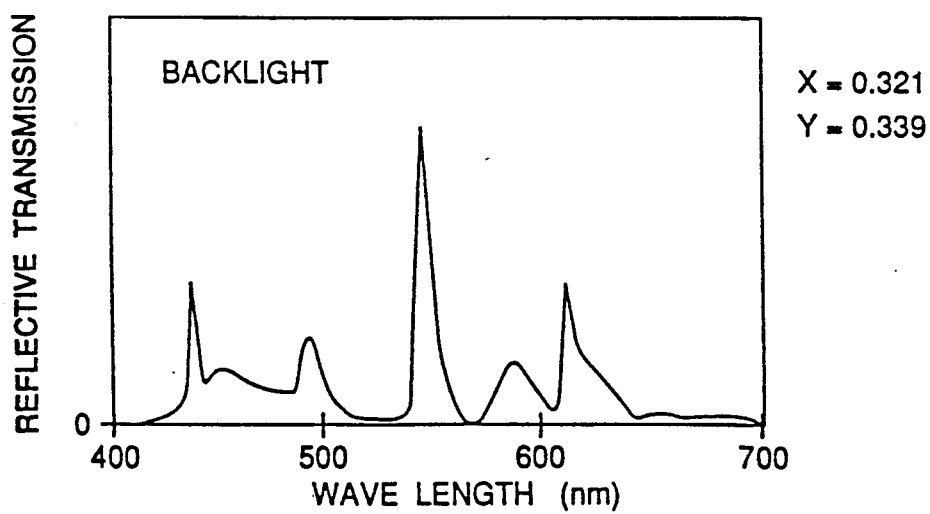
FIG. 18 shows the spectral distribution of a backlight that may be used with the display system of FIG. 17.

FIG. 18 shows the spectral distribution of a representative fluorescent backlight 62 that may be employed in the embodiment of FIG. 17. As is characteristic of florescent lighting, the spectrum has characteristic peaks corresponding to certain chemical components used in the light. These peaks (and the nulls) can be tailored to specific applications by changing the chemistry of the lamp.

Figure 19:
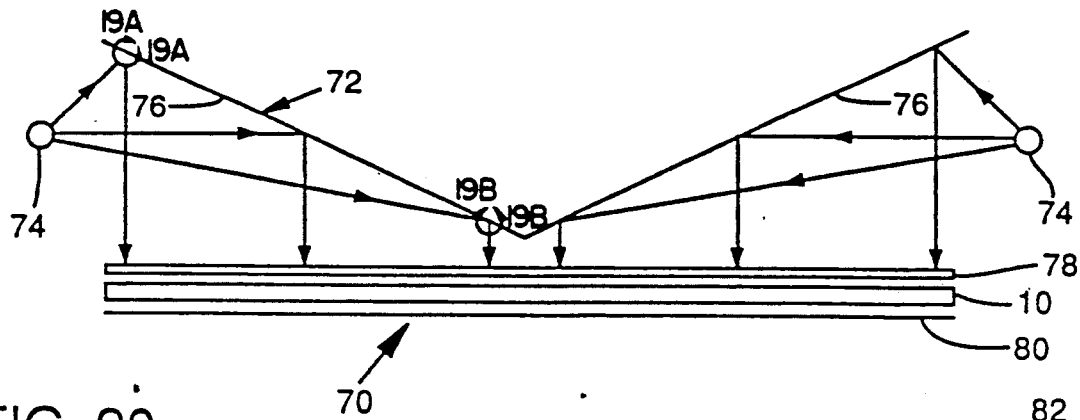
FIG. 19 shows a second direct view display system according to the present invention.

In a second direct view embodiment 70, shown in FIG. 19, the backlit illumination can be collimated by a novel arrangement employing a parabolic mirror 72 (desirably in Fresnel form). In this embodiment, a pair of linear light sources, such as fluorescent bulbs 74, illuminate a generally flat mirrored surface 76 that has facets arranged to provide one axis of collimation. The angles of the facets vary with placement on the surface to simulate a sectioned parabolic reflector. Light reflected from this mirrored surface is substantially collimated. However, to remove any stray off-axis light, a microvenetian blind material 78, such as Light Control Film marketed by 3M Corp, is desirably placed between the mirror and the display subassembly. This material is a thin plastic film containing closely spaced black microlouvers to absorb light misaligned with respect to the louvers. Substantial collimation of the illuminating light is thus achieved.

In the FIG. 19 embodiment 70, a translucent light dispersing material 80, such as a ground glass plate or a commercially available diffusion material (i.e. Rolux film manufactured by Rosco of Port Chester N.Y.) is mounted adjacent the exit side of the display subassembly 10 to display the resulting color image.

Figure 20:
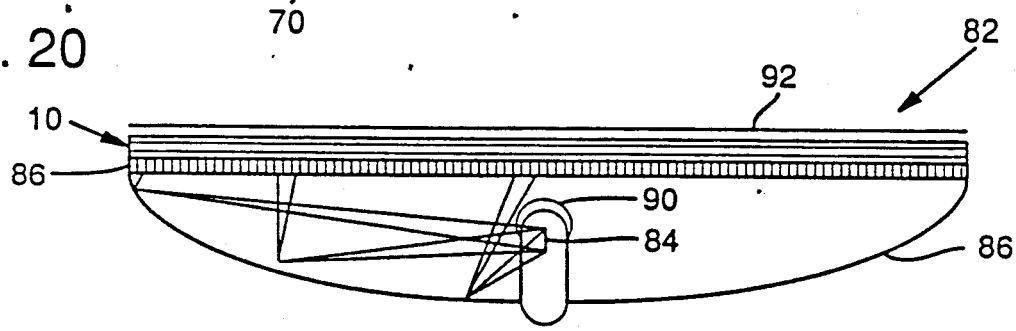
FIG. 20 shows a third direct view display system according to the present invention.

FIG. 20 shows a third direct view embodiment 82 of the invention. In this system, the display subassembly 10 is illuminated by a tungsten-halogen lamp 84 that operates in conjunction with a curved reflector 86. The reflector is computer designed (using well known optical modeling programs or ray tracing techniques) to provide equal energy illumination to all regions of the display subassembly. A corrector plate 88, mounted adjacent the display subassembly, provides a normalization of illumination angle, i.e. perpendicular to the assembly.

The lamp 84 in the FIG. 20 embodiment is desirably part of a removable module that also includes a shield 90 for preventing direct illumination of the display subassembly by the lamp. Again, a diffuser material 92 is mounted adjacent the exit side of the display subassembly to permit direct, wide angle viewing.

Figure 21:
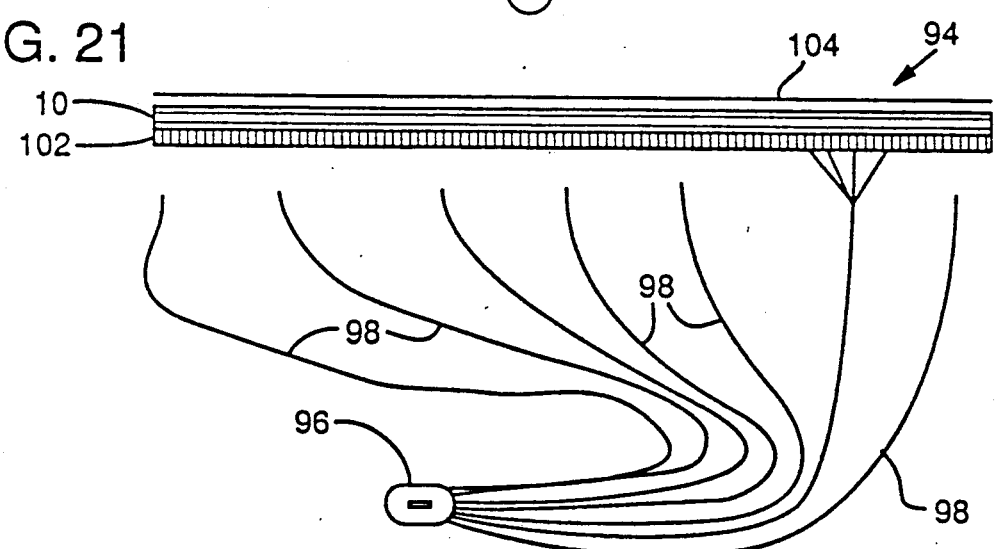
FIGS. 21 and 22 show a fourth direct view display system according to the present invention.
Figure 22:
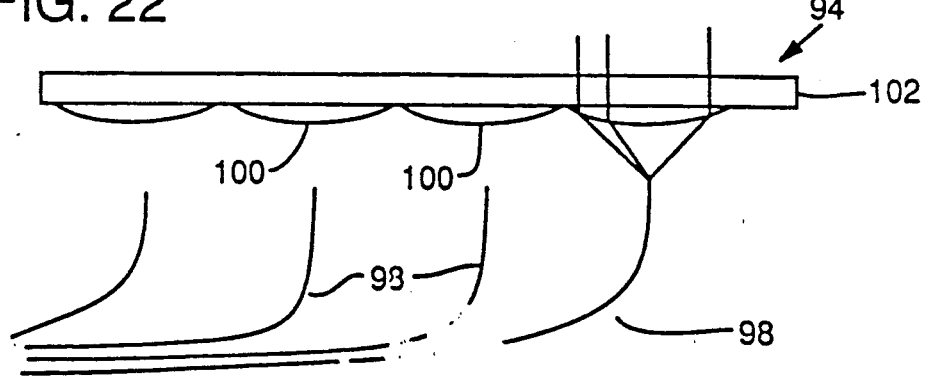

A fourth direct view embodiment 94 of the invention is shown in FIGS. 21 and 22 and includes fiber optic backlighting of the display subassembly. In the illustrated system, a tungsten-halogen lamp 96 is again used, but this time is optically coupled to a bundle of optical fibers 98. Each fiber terminates at a microlens 100 on a plate 102 of such microlenses. These microlenses can be arrayed in a rectangular pattern on the plate 102, or can be arranged in a hexagonal pattern for higher density. In either event, the microlenses are matched to the dispersion patterns of the fiber so that light exiting the fibers is substantially collimated by the lenses. Again, a diffuser optic 104 is desirably positioned adjacent the exit side of the display subassembly.

In the FIG. 21, 22 embodiment, it is desirable that tolerance be provided for non-uniformities, and maximum use be made of all light, including paraxial rays. Fortunately, with the intimately contacting diffuser 104 on the top surface of the display subassembly, there is a reasonable "blur" tolerance. Some stray light can even be beneficial to "antialias" the jagged square pixels.

The above-described direct view displays may each be advantageously incorporated into a portable or laptop computer. "Portables" are generally considered to be computers that are sized for ready portability, but still require use of 120 volts AC from a wall outlet. They often take a suitcase-like form. "Laptops," on the other hand, generally rely on an internal rechargeable battery and often take a "clamshell" form.

FIG. 23 shows a portable computer 106 including a direct view display 108 according to the present invention. To operate the computer, the case 112 is opened and the display is positioned for viewing. (In some portables, the display is coupled to the computer by a coiled cable and can be positioned where desired.) When the computer is no longer needed, the display is packed into the case, secure against abuse.

FIG. 24 shows a laptop computer 114 including a direct view display 108 according to the present invention. As can be seen, the display is coupled to the remainder of the computer by a hinge arrangement 115. The laptop's internal rechargeable battery 105 powers both the computer and the display.

Again, to operate the computer 114, the hinged display 108 is lifted, exposing it for viewing. When the computer is no longer needed, the hinged display is secured in its collapsed position, protecting it from abuse.

Figure 25:
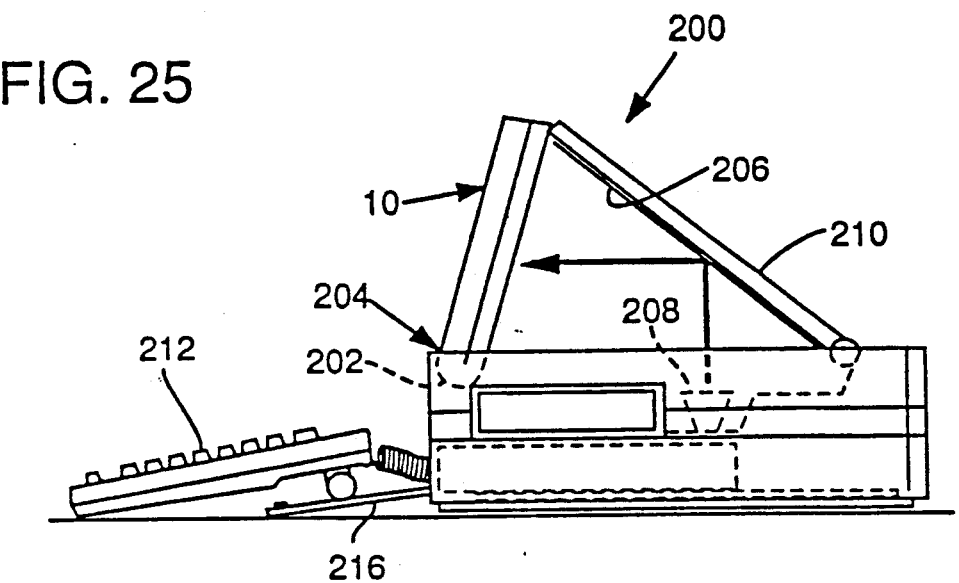
FIG. 25 is a view of a portable computer including a direct view display according to one embodiment of the present invention.
Figure 26:
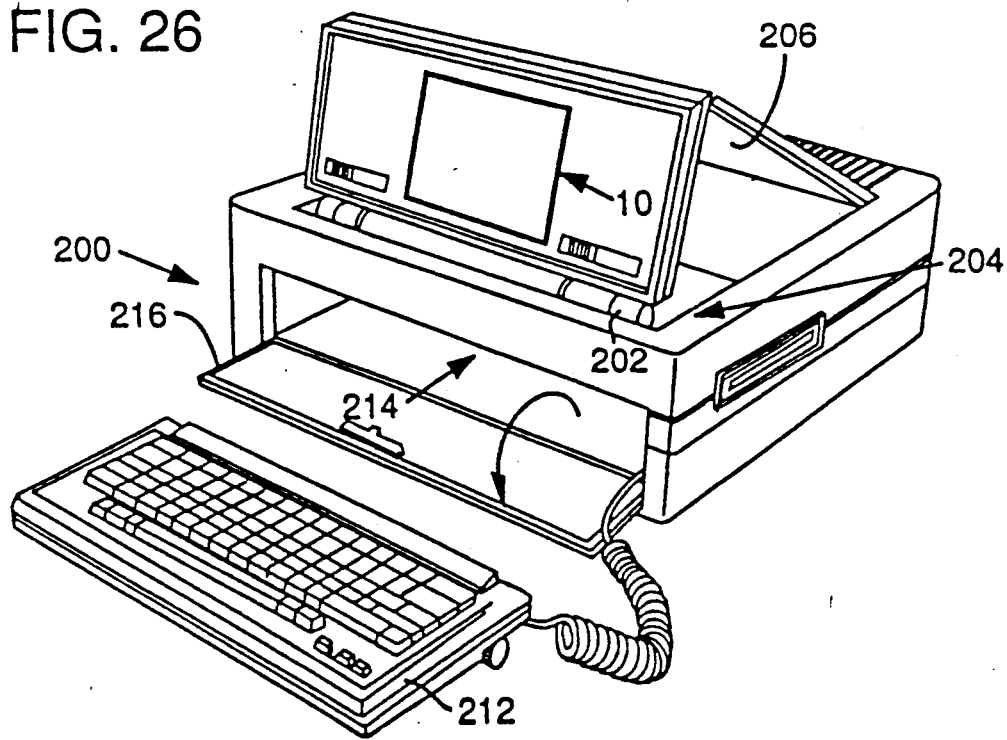
FIG. 26 is a perspective view of the portable computer of FIG. 25.

FIGS. 25–30 illustrate a variety of other portable computer designs that are adapted for use with a display subassembly according to the present invention. In FIGS. 25 and 26, a computer 200 includes a display subassembly 10 mounted by a hinge 202 to the front top edge of a computer case 204. When in use, the display subassembly 10 is illuminated by light reflected off a mirrored surface 206 from a lamp 208. The lamp 208 is a point source (i.e. it has a relatively small physical extent, such as a small filament) and is fixedly attached to the body of the computer case 204. The diverging light from this point source is collimated by a flat lens (not particularly shown in the figures) mounted adjacent the display subassembly.

To fold for storage, the display subassembly 10 on computer 200 pivots rearwardly into the body of the computer case, and the panel 210 to which the mirrored surface is attached folds down over the display, protecting it from abuse. The computer keyboard 212 slides into a recess 214 in the front portion of the computer case and a door 216 closes to secure the keyboard in place.

Figure 28:
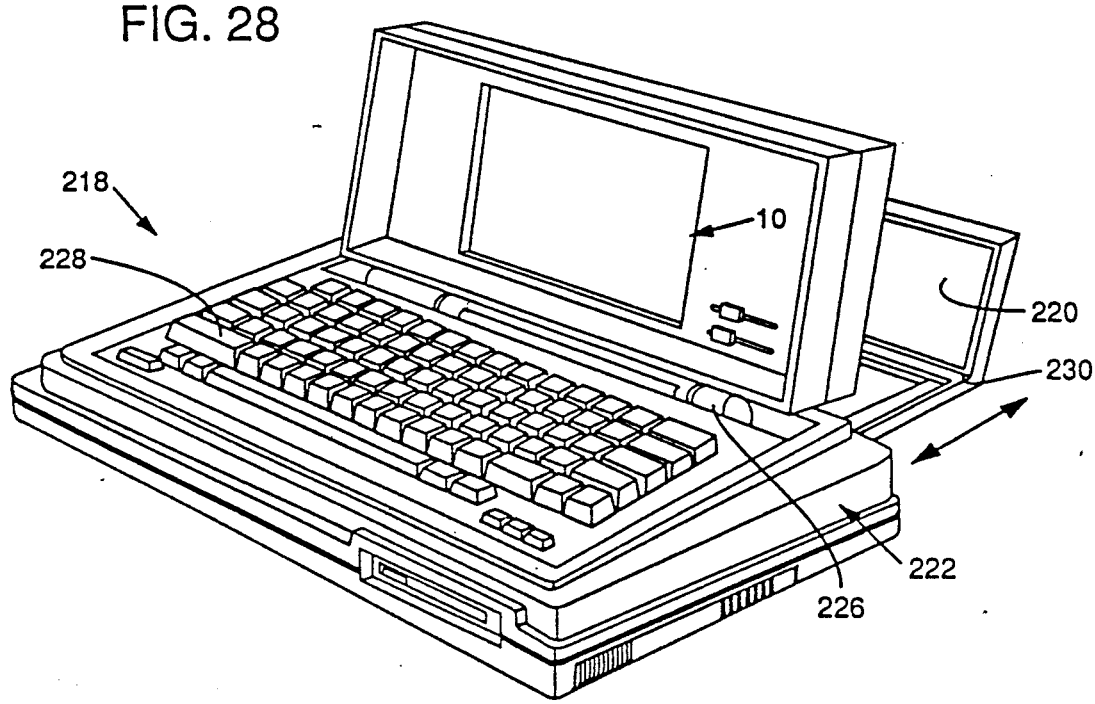
FIG. 28 is a perspective view of the portable computer of FIG. 27.
Figure 27:
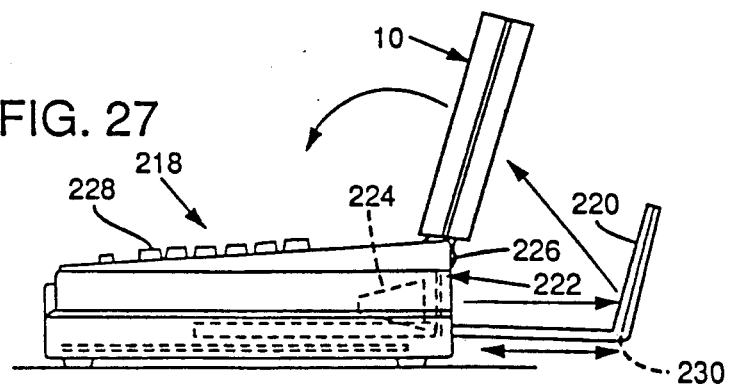
FIG. 27 is a view of a portable computer including a direct view display according to another embodiment of the present invention.

FIGS. 27 and 28 show a portable computer 218 in which the display subassembly 10 is illuminated by light reflected from a mirror 220 that slides out the back of the computer case 222. Again, the illumination is provided by a point source, such as a tungsten-halogen bulb 224 that is mounted to the computer case 222 rather than to display subassembly itself.

In operation, the display subassembly is positioned in a substantially vertical orientation on a hinge 226 at the rear top portion of the case. To collapse for storage, the display subassembly folds forwardly and latches in place over the keyboard 228. The mirror 220 is slid towards the case and locks with the mirrored surface adjacent the case's back side. (In another embodiment, the mirrored surface is small enough to be positioned entirely within the computer case. In still another embodiment, the illustrated mirror is hinged at point 230, permitting it to be folded flat and slid entirely within the computer case.)

Again, a flat correction lens is desirably mounted on the rear of the display subassembly to collimate the light reflected from the mirror 220.

Figure 30:
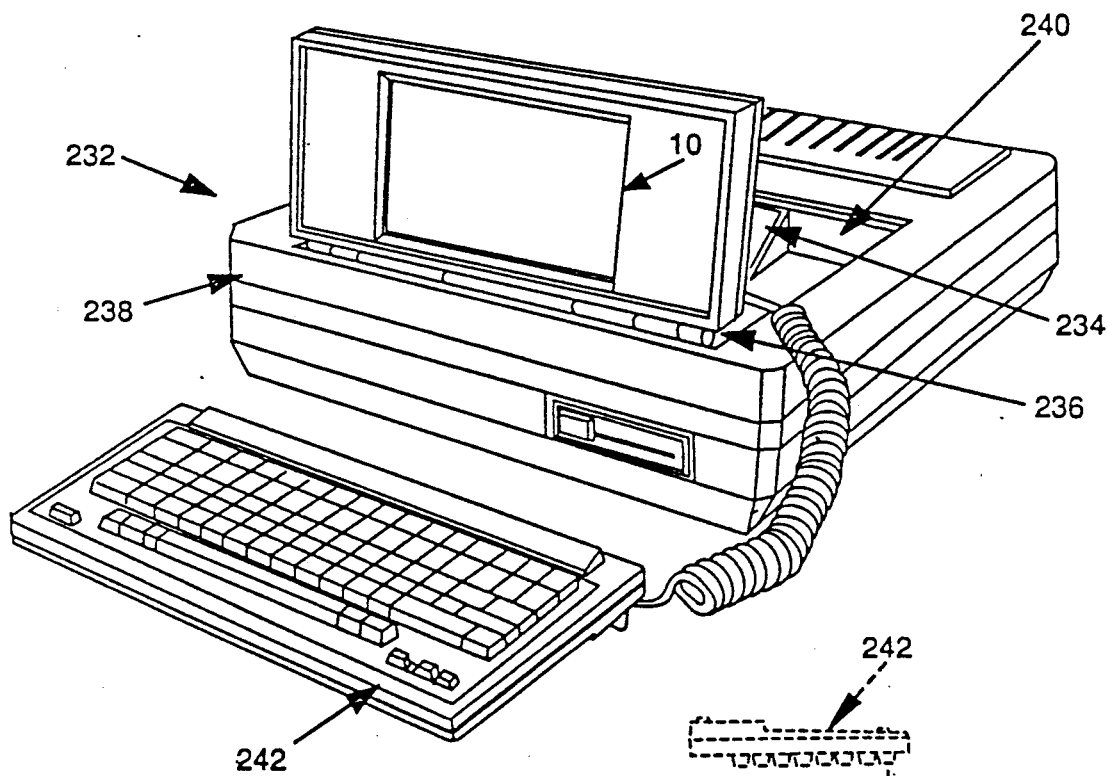
FIG. 30 is a perspective view of the portable computer of FIG. 29.
Figure 29:
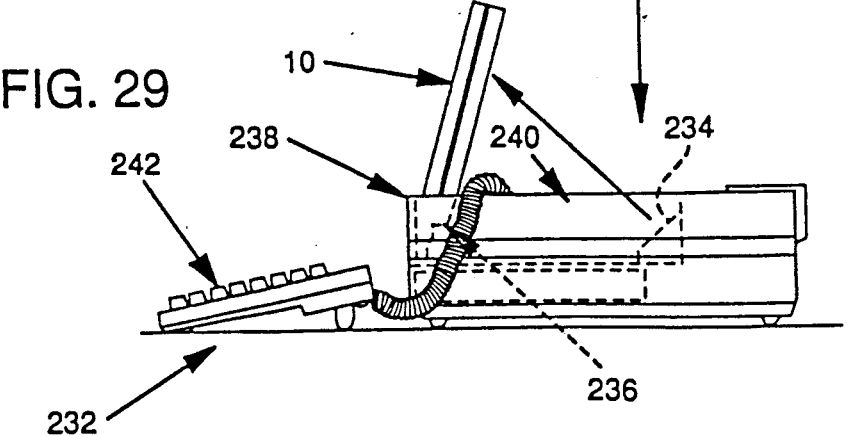
FIG. 29 is a view of a portable computer including a direct view display according to yet another embodiment of the present invention.

FIGS. 29 and 30 show a portable computer 232 in which the display subassembly is directly illuminated from a point source 234, without an intervening mirror. In this embodiment, the display subassembly 10 is again attached by a hinge 236, this one in a cavity 240 in the front portion of the computer case 238. In use, the display subassembly 10 is positioned substantially vertically and is illuminated by the point source 234. To fold for storage, the display subassembly 10 folds rearwardly into the cavity and is held secure by the keyboard 242, which is inverted and latched into place to serve as a top cover.

FIG. 34 shows yet another computer 250 according to the present invention. In computer 250, a point light source 252 is disposed within a case 254 and illuminates a display subassembly 256, which fills an aperture formed in the case. An image formed by projection of light through this display subassembly is projected on a screen 258 positioned at the back of the computer case 254. In the illustrated embodiment, the projection screen is flexible and is rolled for storage about a spring-loaded roller 260 disposed at the bottom rear portion of the computer case. To erect the screen for viewing, a screen support 262 is pivoted upwardly from its collapsed storage position to an upright position at the back of the computer. The unrolled screen can then be fastened to the screen support by one or more clips, or like means (not shown).

It will be recognized that in all of the foregoing embodiments, the pixel pitches on the various panels may be made different (as shown in FIG. 15) to align the pixels with the orientation of the incoming light. By such a construction, it is not necessary to collimate or otherwise process the light prior to illumination of the stacked subassembly. (It will further be recognized that the invention can be practiced by simply illuminating a stack of uniformly pitched panels with uncollimated light, although parallax effects may cause improper pixel registration, blur and false color edges.)

Figure 31:
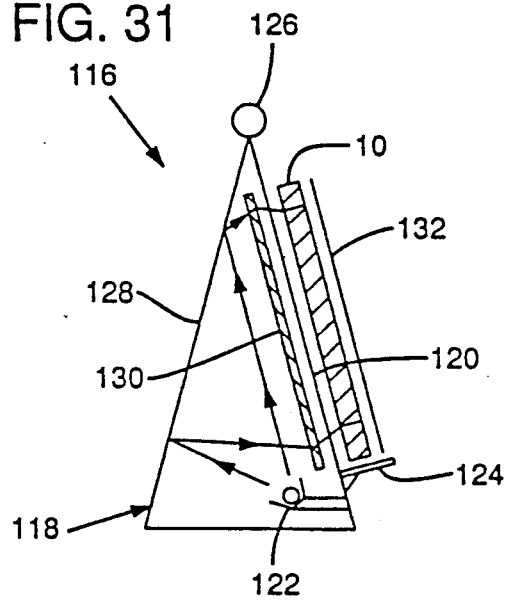
FIG. 31 shows a display stand that permits a display subassembly to be backlit for direct viewing.

FIG. 31 shows a final embodiment 116 illustrating use of a display subassembly 10 according to the present invention in a direct view display. In this embodiment, the display subassembly is removably positioned on an illumination stand 118 for direct viewing. The illumination stand 118 has a light-transmitting surface 120 against which the display subassembly can rest, and an internal light source 122 for directing illumination therethrough. A small shelf 124 on which the display can be positioned is provided on the exterior of the stand.

The stand 118 is desirably collapsible to permit ready portability. This can be achieved with a hinge and bellows arrangement 126. Small size can be maintained by using folded optics that include mirroring on the inside back wall 128 of the stand.

The stand may be provided with optics that emulate the optics of a conventional overhead projector. That is, these optics may focus light incident on the display 10 so that it converges on a point a short distance away. In the illustrated embodiment, these optics may comprise a Fresnel plate lens 130. In such case, the Fresnel entrance optic 44 used in the FIG. 13 projection system embodiment may be used to collimate the focused light prior to its illumination of the display subassembly.

In this embodiment, the exit optic 132 is again a simple translucent dispersion medium to permit wide angle viewing of the collimated image.

It will be recognized that the viewing stand 118 advantageously permits an LCD display to be used either as a projection device for large audiences (i.e. as an "electronic transparency"), or as a single-user computer screen.

Systems with Split Optic Paths

While the foregoing discussions have been directed to display subassemblies comprised of single stacks of panels, additional advantageous results can sometimes be achieved by splitting the stack into two or more sub-stacks and illuminating each separately. One such arrangement is shown in FIG. 32.

Figure 32:
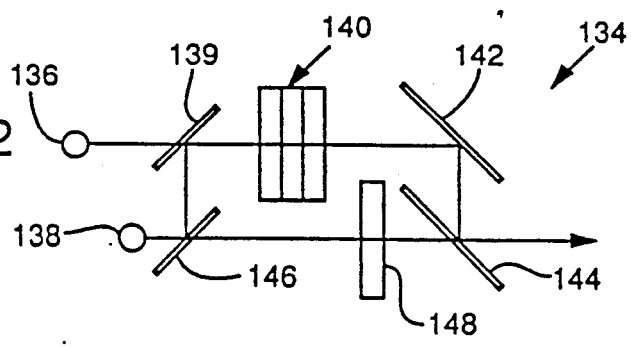
FIG. 32 shows a display system employing two light sources and two optical paths according to the present invention.

In the FIG. 32 arrangement 134, the stacked panels are split into two sub-stacks to permit illumination by two different light sources. The first light source 136 is a tungsten-halogen incandescent lamp, which produces a spectrum that is strong in red, especially when the lamp's operating voltage is decreased, which may be desired to increase the lamp's life. The second light source 138 is a mercury arc-lamp, which produces a spectrum rich in deep blue light (430 nm), with a large amount of energy also in the mid-green (540 nm) portion of the spectrum. The complementary spectrums produced by these two light sources are advantageously combined in the embodiment of FIG. 32 to achieve good brightness, long lamp life and high color temperature "white."

As shown in FIG. 32, light from the tungsten-halogen lamp 136 follows a first optical path that includes a holographic or dichroic mirror 139. (This mirror may be designed to pass all of the spectrum except a narrow notch [20 or 30 nm] at 540 nm.) This filtered light continues on to illuminate a stacked assembly 140 that includes red- and green-controlling panels (i.e. "cyan" and "magenta"). (For clarity of presentation, the polarizers, collimator, and other optical elements used in this stack and elsewhere in the FIG. 32 embodiment are not illustrated. Following the logic discussed above, the entrance polarizer on the magenta panel may be red, the exit polarizer on the cyan panel may be green, and the intermediate polarizer may be neutral.) The light exiting the stacked assembly 140 is reflected off mirrors 142 and 144 and is directed to exit optics for projection or direct viewing. The tungsten-halogen light 136 thus provides illumination at the red and green portions of the spectrum, and the stacked assembly 140 controls these colors.

Light from the second, mercury arc-lamp 138 follows a second optical path towards a dichroic mirror 146, which reflects green light up to mirror 139 (for additional illumination of the red/green control stack 140) and passes blue light into a blue controlling (i.e. "yellow") LCD 148. The light exiting this blue LCD continues to and through the mirror 144, joining with the red and green light and continuing to the exit optics. A full color image is thus produced.

(It will be recognized that splitting the light in this fashion provides some design freedom, viz., that the red- and green-controlling panels can be tuned without regard to their blue performance [since they encounter no blue light] and the blue-controlling panel can be similarly tuned without regard to its red and green performance.)

If increased contrast is desired, a black/white panel may be included in either the first or second optical paths. Alternatively, an additional magenta (i.e. green controlling) cell may be included in the stack 140 since green is the dominant contributor to photopic brightness.

While the FIG. 32 embodiment provides different optical paths for different portions of the optical spectrum, in other embodiments the different optical paths can be dedicated to different polarizations of light. Such split-by-polarization systems offer improved brightness since the cross-polarized light that is filtered from single path systems is instead directed to a second path where it is utilized.

Figure 33:
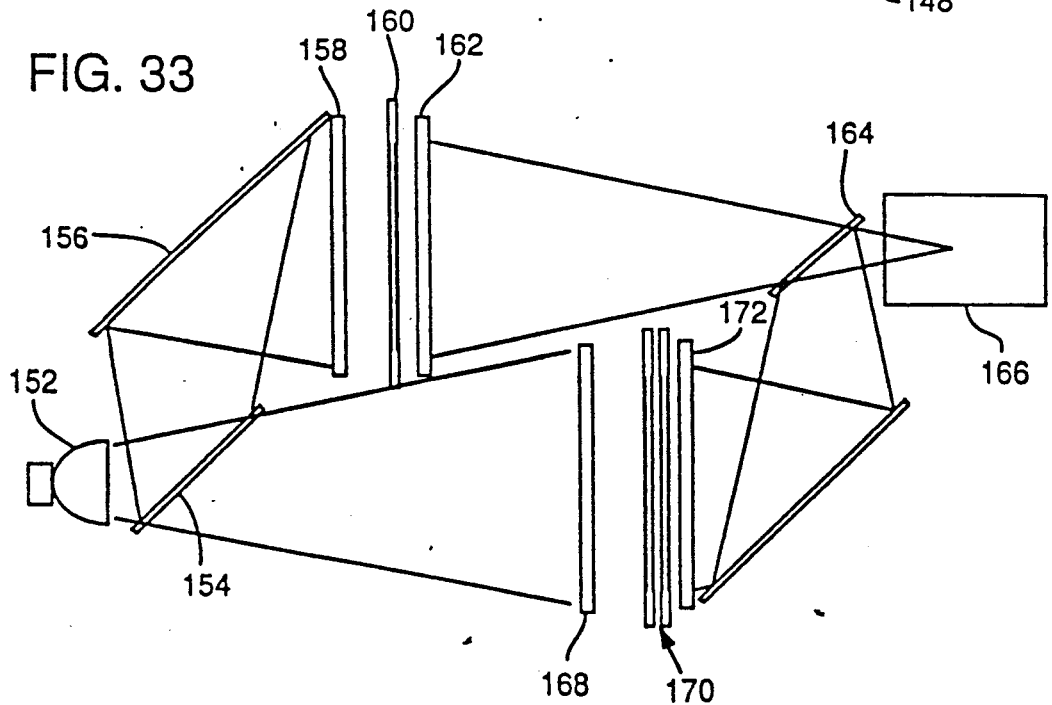
FIG. 33 shows a display system employing one light source and two optical paths according to the present invention.

FIG. 33 shows a system 150 similar to that of FIG. 32, except the FIG. 33 system uses a single light source 152. Blue light from this light source is stripped off by a dichroic mirror 154, reflected off a mirror 156, collimated by a collimator 158, and directed into a blue controlling LCD assembly 160. Light exiting this LCD assembly is focused by a lens 162 through a blue-passing mirror 164 and into a lens 166 for projection onto a viewing screen.

The red/green light from lamp 152 passes through mirror 154, is collimated by a collimator 168, and illuminates a stack 170 that includes cyan and magenta panels (which control red and green light, respectively). The light exiting the stack 170 is again focused by a lens 172, reflected off the mirror 164 and directed into the projection lens 166.

Alternative Embodiments

While the foregoing description has focused on a single class of embodiments that incorporate supertwisted nematic panels, it will be recognized that a variety of other embodiments can be constructed using different display elements. Exemplary is the display 300 shown in FIG. 35. In this display, a thin film transistor (TFT) liquid crystal panel 302 is operated in conjunction with an optical element 304 that exhibits an electrically controllable birefringent (ECB) effect. Thin films transistors are known in the art and disclosed, inter alia, in U.S. Pat. Nos. 4,821,092, 4,819,038, 4,816,885, 4,776,673, 4,743,099, 4,743,098, 4,723,838, 4,715,930, 4,654,117, 4,649,383, 4,636,038, 4,621,260, 4,599,246, 4,591,848, 4,581,619, 4,461,071, 4,386,352, 4,385,292, 4,299,447 and 3,824,003, the disclosures of which are incorporated herein by reference.

In the illustrated embodiment, a limited birefringence mode liquid crystal effect may be given to the TFT panel by adding a retardation film to the (90°) TN of a standard TFT-LCD and by selecting the polarization orientation appropriately.

In the preferred embodiment, the TFT is optimized for whitest white (instead of blackest black). The TFT is also tuned to broaden the dip in the spectral transmissivity curve and place it at the appropriate wavelength required by the stacked combination of panels. In some such embodiments, a double dip in this curve may be obtained by use of a retardation film. By providing several layers of retardation film, ideal "notch filter" performance may more nearly be achieved.

The ECB element may be a supertwisted nematic panel detailed earlier, or may comprise a conventional twisted nematic cell, or a great variety of other elements, such as electro-optic or electro-acoustic crystals. (STN cells have generally not been used in a classical electrically controlled birefringence mode due to the very restricted range of operating voltages dictated by multiplexibility requirements. Rather, they have been operated in a bistable mode, operating in either the select or non-select states, not in between. The present invention exploits the voltage-dependent birefringence exhibited by STN cells within the narrow R.M.S. operating range between $V_{select}$ and $V_{non-select}$ to achieve a broad range of intermediate birefringent colors.)

The TFT panel 302 and ECB panel 304 are sandwiched between three polarizers 306, 308 and 310. The subtractive coloration provided by each pixel in the ECB display element 304 is a function of the signal driving that pixel. The range of colors produced by this variable birefringence is augmented by one or more additional colors attainable by use of the TFT panel 302 to produce a full color display.

A related embodiment is shown in FIG. 36. In this figure, a display subassembly 320 comprises a white/yellow mode STN (or DSTN) panel 322, a thin film transistor panel 324 and a color shutter assembly 326 in stacked arrangement with associated polarizers. Color shutter assemblies are known in the art and are described, inter alia, in U.S. Pat. Nos. 4,758,818, 4,726,663, 4,652,087, 4,635,051, 4,611,889 and 4,582,396, the disclosures of which are incorporated herein by reference.

In the illustrated display subassembly 320, the color shutter is operated in alternate frames to block red and green light, respectively (thus giving the appearance of cyan and magenta). The TFT provides a very fast switching speed. The STN cell 322 is relatively slower than the TFT, but the blue light it controls is relatively less perceptible to the human eye, so the slower response speed is of little significance.

The FIG. 36 embodiment is intended to lower the costs associated with making a high-information content full color LCD based display system. This embodiment requires only one (monochrome) TFT panel, as opposed to three that may otherwise be used to control red, green and blue.

The STN 322 may be grey-scaled, using a single bit plane of RAM, to 8 or 16 levels. It can provide sufficiently fast response time for moving images.

The TFT 324 is operated at twice the normal frame rate (i.e. greater than or equal to 120 Hz) and, along with the color shutter 326, controls the red and green image fields sequentially. Both the color shutter and the TFT (with their associated polarizers) are tuned to leak blue all the time, thereby improving the color balance, especially when a tungsten-halogen lamp is used.

In still another embodiment of the present invention, two LCD panels may be stacked and operated independently to produce a full gamut of colors. A display assembly 330 according to this construction is shown in FIG. 37. For expository convenience, the panels will be referenced as STN panels 332, 334, although again, a variety of other technologies can be used.

STN panels 332 and 334 are fabricated with a higher value of Δnd than those STN panels illustrated earlier. An exemplary panel may have a 240 degree twist angle, with a Δnd value of 1.4. The larger Δnd value produces a wider variation in the voltage variable coloration effect. When a high information content, multiplex-addressed LCD panel is grey-scaled (either by PWM or multiple frame averaging), intermediate voltages (between $V_{select}$ and $V_{non-select}$) can be attained on each pixel, despite the nearly-bistable switching behavior that characterizes STN cells.

Between neutral polarizers, the first panel 332 can obtain, for example, the color gamut shown in FIG. 38. By using a blue (ideal characteristic, pure blue leakage only) polarizer, the gamut is as illustrated in FIG. 39, instead.

As can be seen, the color gamut with the blue polarizer is shifted towards the blue, with the result that "yellow" cannot be obtained, but "white" is obtained instead. The "blue" may not be as pure as desired ideally, but human-factors experts suggest that a desaturated blue is better for communicating visual information.

If the first polarizer 336 is dyed blue, producing the color gamut shown in FIG. 39, the second panel 334 needs only to be able to make yellow and white to make the full gamut of saturated primary and secondary colors. To be safe and insure a true black state, the leakages of the first and third polarizers 336, 338 must not overlap, so rather than choose a yellow polarizer for polarizer 338, it is somewhat preferable to choose an orange polarizer instead (FIG. 40). Of course, by tuning the Δnd of the LCD and, optionally, adding additional layers of birefringent material (such as retardation films), various birefringence colors can be made within each layer. A desirable display according to this embodiment has the following characteristics:

1) good white and black states (overall contrast ≧ 10:1);

2) good color saturation (especially redness of red); and 3) extra good blue light transmission to counteract tungsten illuminant (to raise the color temperature, i.e. color correction).

By using various commercially available color polarizers, the display subassembly can be optimized for various purposes and with different performances for different needs.

Other possibly complimentary pairs of colors for polarizers 336 and 338 are cyan and red, green and red, green and violet, green and magenta, and perhaps green and blue.

The magenta formed by electrically controlled birefringence is generally poor, because the red edge is too soft and must be supplemented. Thus, a red polarizer is desirable, which provides excellent sharpness (i.e. steepness of edge between yellowish-green and red). The gamut of the first LCD 332 may thus be, inter alia, one of the following:

a) red/magenta/white;
b) red/yellow/white; or
c) magenta/yellow/white.

In these cases, the second panel 334 should subtract red, at least, so cyan is its chief color and it may attain one of the following:

d) cyan/magenta/white;
e) green/cyan/white;
f) cyan/green/yellow/white; or
g) blue/cyan/white.

Preferred combinations include a+f, b+g or c+d, above. (a+e requires alternating red and green to make yellow; b+e is undesirable because it requires alternating red plus blue pixels to make magenta and cannot make blue; a+d cannot make green, b+d cannot make blue, etc.)

While the display subassembly 330 has been described as operating in a color subtractive mode, it will be recognized that the display may also be operated in an additive mode, either with adjacent pixels being operated together to add spatially, or with a single pixel in the stacked assembly being operated with alternate colors to add temporally.

If both liquid crystal panels 332, 334 are tuned to produce four distinct shades of color, they can be operated co-jointly to product sixteen colors without the need for grey scaling.

Of the foregoing combinations, the presently preferred is to tune panel 332 to produce a color gamut extending from magenta, through yellow to white, and dye polarizer 336 red. Panel 334 can be tuned to produce a color gamut extending from cyan, through green and yellow to white, and polarizer 338 can be dyed green. Again, partial compensation can be used to optimize the various colors produced.

Concluding Remarks

It will be recognized that the use of colored polarizers with birefringent cells provides a great deal of design freedom. The reason is that a colored polarizer renders the response of a cell at certain wavelengths irrelevant. Taking as an example a magenta (green blocking) cell, the cell must normally be optimized for a number of factors: high transmissivity of blue light in both the select and deselect states, low transmissivity of green light in the select state but high transmissivity of green light in the deselect state, and high transmissivity of red light in both states. Such optimization typically requires a compromise of all factors. When used in conjunction with a magenta polarizer, however, the cell's transmissivity at blue and red becomes only a minor concern. The magenta-dyed polarizer causes the cell to pass blue and red regardless of the characteristics of the cell. With the importance of these factors minimized, the design of the cell can focus on just one factor—high contrast between the select and deselect states for green—and no compromises need be made.

In optimizing the response of the cells, it is sometimes desirable to use additional optical components. For example, in order to tune the range of birefringence effects it is sometimes desirable to include retardation films adjacent the cells.

Figure 2:
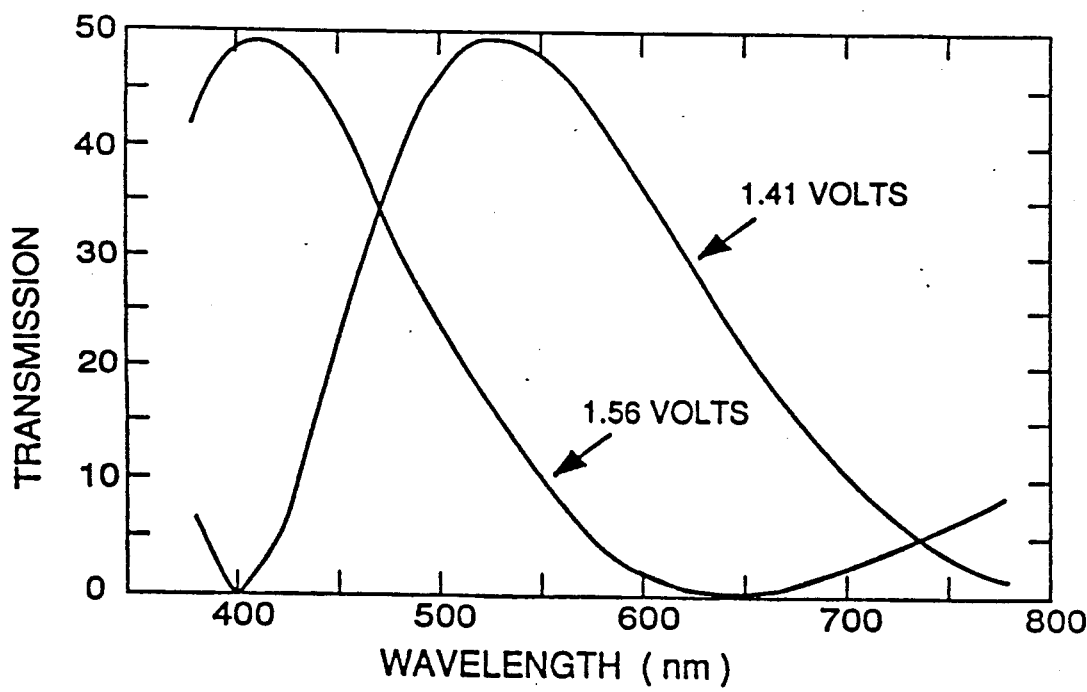
FIG. 2 shows the transmission spectrum of a representative STN cell when operated in its select state (with an excitation voltage of 1.56 volts) and in its deselect state (with an excitation voltage of 1.41 volts).

A birefringent cell, operated in conjunction with a neutral polarizer, exhibits a sinusoidal transmissivity versus wavelength curve, as was shown in FIG. 2. Taking again the example of a magenta (green blocking) cell, the cell's Δnd is selected so the minimum of its sinusoidal curve falls somewhere in the green portion of the spectrum. This minimum, however, may be relatively narrow, permitting relatively large amounts of higher and lower wavelength green light to pass through the cell/polarizer combination. To broaden this "notch" in the transmissivity curve, a retardation film may be employed. While retardation films are generally used to tune the cell's characteristics (i.e. to move the dip in the curve up or down in wavelength), the film's action in reversing part of the cell's twist also serves to broaden the dip somewhat. Thus, the transmissivity curve of the magenta cell in its deselect state may be made to more nearly approximate the ideal (i.e. a rectangular notch that encompasses all of green—500 to 600 nm.).

While the display subassembly has been described as including single supertwisted liquid crystal panels, other types of birefringent optics, such as double supertwisted panels or single panels embodying other technologies (such as electro-optic [i.e. lithium tantalum niobate], acoustic-optic, or PET cells) can alternatively be used. A higher resolution display can be achieved by stacking two or more cells for each color, with the active lines on one cell overlapping active lines on the other, similar to the basic technique shown in U.S. Pat. No. 4,448,490, the disclosure of which is incorporated by reference. Faster switching times can be achieved by stacking several thin panels for each color, as disclosed in U.S. Pat. No. 4,547,043, the disclosure of which is incorporated by reference. The basic principles of the invention are also applicable to other display technologies, such as interference color systems.

In other embodiments, certain birefringent panels may be stacked without intervening polarizers. For example, two panels (with or without different $\Delta nd$) may be stacked without an intermediate polarizer to produce white, yellow, green and cyan in the four combinations of select states. A green polarizer can be used on the outside layer, since green is common to all these colors. Such an embodiment is especially valuable for a white, magenta, cyan and blue combination, since overhead projection needs more blue throughput, which may be obtained by use of a "pure blue" polarizer.

In still other embodiments, if any of the LCD birefringence colors are not ideal, some attenuation of specific light wavelengths might enhance the color gamut and overall contrast. For example, two polarizers might be used together, or a weak color filter compensator (i.e. a conventional gelatin filter) might be added.

It will be recognized that known grey scaling techniques can readily be applied to the present invention to provide the full gamut of possible colors. In one such embodiment, grey scaling is applied to each of the three colored cells. In another embodiment, grey scaling is applied simply to a fourth (typically black) cell included in the stack. U.S. Pat. Nos. 4,840,462, 4,840,460, 4,818,078, 4,766,430, 4,743,096, 4,709,995, 4,560,982, 4,508,427, 4,427,978 and 4,043,640 teach various grey scaling techniques and are incorporated herein by reference.

It will further be recognized that the invention can be practiced with more or less panels than the three or four illustrated. For example, it is advantageous to provide laboratory instruments, such as oscilloscopes and analyzers, with displays formed by stacking two supertwisted birefringent panels with one or more colored polarizers. The display may take virtually any of the forms discussed above and still be suitable for inclusion in the instrument. While color gamut is compromised somewhat by such a two panel stack, brightness is increased and cost is reduced.

Finally, it will be recognized that many advantageous results can be achieved by cojointly operating several TFT panels, either in stacked or split-optic arrangement, rather than including a single TFT panel in a stack with other panels, as particularly discussed above.

Some such embodiments, including certain of the split optic path embodiments, do not rely on exploitation of the birefringence effect. A number of such embodiments may be realized by substituting TFT panels for the STN panels in the illustrated embodiments. (In such embodiments, the neutral polarizers typically provided on a TFT panel by the manufacturer may be removed, any spectral deficiencies of the panel may be compensated for by retardation film [i.e. commercially available panels are particularly deficient in the blue portion of the spectrum, which deficiency can be alleviated by retardation film], and colored polarizers may be added to achieve the benefits discussed earlier.)

In view of the wide variety of embodiments to which the principles of our invention may be applied, it should be recognized that the illustrated embodiments are to be considered illustrative only and not as limiting the scope of the invention. Instead, we claim as our invention all such modifications as may come within the scope and spirit of the following claims and equivalents thereto.

We claim:

1. A method of producing a color display comprising:
   providing first and second optical assemblies, each assembly including a plurality of independently operable pixels, each of said pixels exhibiting a birefringent effect that varies in response to a signal applied thereto;
   stacking said assemblies with a pixel in the first assembly linearly aligned with a corresponding pixel in the second assembly;
   interposing a first polarizer between the assemblies and sandwiching the stack between a second and a third polarizer wherein said second and third polarizers are colored complementary colors; and
   applying a first dynamic signal to the pixels in the first assembly and applying a second dynamic signal to the pixels in the second assembly so as to selectively change the birefringent effect.

2. The method of claim 1 which includes providing a supertwisted nematic liquid crystal panel in each of said first and second optical assemblies.

3. The method of claim 1 which further includes enhancing display brightness by interposing a polarizer dyed a color other than black between the assemblies.

4. The method of claim 1 further comprising:
   applying said first dynamic signal to said pixels in the first assembly wherein said first dynamic signal changes selectively and periodically between more than two values so that said second dynamic signal differs from said first signal thereby producing more than two distinct birefringent effects.

5. The method of claim 1 wherein each assembly has a value of $\Delta nd$ greater than 0.05 $\mu$m and is individually tuned to produce a different plurality of colors in cooperation with additional layers of birefringent material and said polarizers to produce a wider voltage variable coloration effect.

6. A display subassembly comprising:
   first, second and third supertwisted nematic birefringent liquid crystal display panels;
   first, second, third and fourth polarizers;
   the first panel being positioned between the first and second polarizers, the second panel being positioned between the second and third polarizers and the third panel being positioned between the third and fourth polarizers;
   the birefringence of the first, second and third panels, together with the polarizers adjacent thereto, cooperating to pass light of first, second and third colors, respectively, when the panels are in first states, and to pass substantially all colors of light when the panels are in second states;

each of said panels having a plurality of independently electronically operable pixels, said panels being stacked so that corresponding pixels in each of said panels are aligned; and at least said first or said fourth polarizers is a color other than black so as to increase display brightness.

7. The display subassembly of claim 6 wherein said second polarizer colored a color common to said first and second colors of light passed by said first and second panels in the first state.

8. The display subassembly of claim 6 wherein said third polarizer is colored a color common to said second and third colors of light passed by said second and third panels in the first state.

9. The display subassembly of claim 6 in which the first, second and third colors are each subtractive primary colors.

10. A color display that can be operated to yield at least the colors black, white, red, green, blue, cyan, yellow and magenta comprising: an entrance and exit polarizer, each polarizer dyed a color other than black and at least a first and second birefringent subassembly disposed between said polarizers in a stacked relationship, each of said subassemblies defining a plurality of pixels, each of said pixels being independently operable to birefringently control passage of a portion of a spectrum of light passing therethrough; and wherein at least two of said subassemblies each includes a supertwisted nematic panel.

11. The display of claim 10 wherein said supertwisted nematic panels have substantially equal values of $\Delta$nd and a third neutral polarizer disposed between said firs and second subassemblies.

12. The display of claim 11 in which the first and second subassemblies are stacked without an intervening polarizer.

13. The display of claim 11 in which the first and second subassemblies are stacked with an intervening polarizer therebetween.

14. The display of claim 13 in which the intervening polarizer is dyed a color other than black.

15. The display of claim 10 in which a supertwisted nematic panel in a first of the subassemblies has a different value of $\Delta$nd than a supertwisted panel in a second of the subassemblies.

16. The display of claim 15 in which the first and second subassemblies are stacked without an intervening polarizer.

17. The display of claim 15 in which the first and second subassemblies are stacked with an intervening polarizer therebetween.

18. The display of claim 17 in which said intervening polarizer is dyed a color other than black.

19. The display of claim 10 further comprising a third subassembly wherein, at least two of said three subassemblies include supertwisted nematic panels each with a substantially equal value of $\Delta$nd.

20. The display of claim 10 further comprising a third subassembly wherein, each of said subassemblies includes a supertwisted nematic panel and each of said panels has a substantially equal value of $\Delta$nd.

21. The display of claim 20 in which at least two of said subassemblies comprise a birefringent LCD panel and at least a passive compensation layer.

22. The display of claim 21 further comprising means for grey scaling said display to yield more than eight colors.

23. The display of claim 10 in which at least one of the subassemblies includes a passive compensation layer.

24. The display of claim 10 further comprising means for grey scaling said display to yield more than eight colors.

25. A color display method comprising the steps:

providing first and second display subassemblies, each of said assemblies including a supertwisted nematic birefringent panel, each of said panels defining a plurality of independently operable pixels, at least one of said display subassemblies additionally including a passive compensation layer to tune the color response thereof;

stacking said subassemblies with a first polarizer therebetween, said first polarizer being dyed a color other than a color intended to be blocked by said first subassembly;

sandwiching the stacked subassemblies between second and third polarizers;

operating pixels in each of the panels independently to birefringently control passage of a portion of a spectrum of light passing therethrough in cooperation with said first, second and third polarizers, wherein at least the eight colors black, white, red, green, blue, cyan, yellow and magenta may thereby be displayed; and controllably grey scaling at least one of the supertwisted nematic panels to yield colors in addition to the aforesaid eight colors.

26. The method of claim 23 in which:

the providing step includes providing a third display subassembly, said third subassembly including a supertwisted nematic birefringent panel and a fourth polarizer;

the stacking step includes stacking said third subassembly with the first and second subassemblies whereby said third display subassembly is disposed between said third and fourth polarizers;

the operating step including operating pixels in the third panel to birefringently control passage of a portion of a spectrum of light passing therethrough in cooperation with said third and fourth polarizers; and the grey scaling step including grey scaling each of the three supertwisted nematic panels.

27. The method of claim 26 in which the providing step includes providing first, second and third display subassemblies, each of said subassemblies including supertwisted nematic birefringent panels with the same values of $\Delta$nd, and at least two of said subassemblies each including a passive compensation layer.

28. An accessory for use with a conventional overhead projector to project electronically generated color images therefrom, the projector having a bulb, a projection lens, and a projection surface having a Fresnel lens thereunder, the Fresnel lens focusing light from the bulb into the projection lens, the accessory being adapted to rest on the projection surface and comprising:

first lens means for receiving converging white light from the projection surface of the projector and collimating said light;

second lens means for receiving collimated light and focusing said light into the projection lens;

a display subassembly positioned between the first and second lens means and illuminated by the collimated light, said subassembly including first, second, third and fourth polarizers and further including first, second and third transmissive liquid crystal birefringent display panels, the birefringence of said panels being tuned, respectively, to first, second and third subtractive complementary colors, each of said panels having a plurality of electronically operable pixels, said panels being stacked so that corresponding pixels in each of said panels are aligned with the direction of the collimated light, the first panel being positioned between the first and second polarizers, the second panel being positioned between the second and third polarizers and the third panel being positioned between the third and fourth polarizers.

29. The accessory of claim 28 in which the first polarizer is colored the first color.

30. The accessory of claim 29 in which the fourth polarizer is colored the third color.

31. The accessory of claim 28 in which the second polarizer is colored a color other than the first or second color or black.

32. The accessory of claim 28 in which:
the first polarizer is colored the first color;
the fourth polarizer is colored the third color;
the second polarizer is colored a color passed by both the first and second panels; and
the third polarizer is colored a color passed by both the second and third panels.

33. The accessory of claim 28 in which:
one of the panels is yellow;
one of the panels is cyan;
one of the panels is magenta;
the colors of the first and fourth polarizers are selected from the list: yellow, cyan, magenta and black; and
the colors of the second and third polarizers are selected from the list: red, green, blue and black;
wherein each of the polarizers is colored differently.

34. A method of projecting a colored image, comprising the steps:
providing first, second and third birefringent liquid crystal panels that include a plurality of independently selectable pixels, said panels being tuned to selectively pass first, second and third subtractive color primaries, respectively, when a signal is applied to each panel;
stacking said first, second and third panels so that corresponding pixels in each of said panels are aligned along an axis orthogonal thereto, said stacked panels forming a subassembly;
providing a first polarizer between the first and second panels;
providing a second polarizer between the second and third panels; and
sandwiching said subassembly and said first and second polarizers between a third polarizer, colored the first subtractive primary color, and a fourth polarizer, colored the third subtractive primary color;

passing light through the subassembly in a direction parallel to the axis of alignment and selectively controlling spectral portions of said light when a signal is applied to pixels on at least one of said panels;

focusing the light exiting the subassembly parallel to the axis of alignment into a projection lens; and projecting the light exiting the projection lens onto a display screen.

35. The method of claim 34 which further includes the step of collimating the light parallel to the axis of alignment of the panels prior to passage into the subassembly.

36. A color display comprising:
first and second optics;
first, second and third display subassemblies disposed between said optics;
each of said display subassemblies including a liquid crystal panel defining a plurality of independently operable pixels wherein at least two of said three liquid crystal panels control color through use of a birefringence effect and wherein at least two of said display subassemblies have different values of Δnd;
first, second, third and fourth polarizers, at least one of said four polarizers dyed a color other than black;
said first display subassembly disposed between the first and second polarizers;
said second display subassembly disposed between the second and third polarizers; and
said third display subassembly disposed between the third and fourth polarizers.

37. The color display of claim 36 in which the liquid crystal panels each comprises supertwisted nematic liquid crystal panels.

38. The color display of claim 36 in which at least one of the display subassemblies includes:
a birefringent liquid crystal panel;
a first passive layer that minimizes the birefringent effect exhibited by the birefringent liquid crystal panel; and
a second passive layer that introduces a birefringent effect.

39. The color display of claim 36 in which at least one of said four polarizers is colored a color other than black.

40. The color display of claim 36 in which one of said display subassemblies operates, in conjunction with the polarizers adjacent thereto, to pass all colors of light in a first state and to pass all colors of light except blue in a second state.

41. The color display of claim 36 in which:
at least one of said four polarizers is colored a color other than black;
one of said display subassemblies operates, in conjunction with the polarizers adjacent thereto, to pass all colors of light in a first state and to pass all colors of light except blue in a second state.

42. The color display system of claim 41 in which said first optic comprises a Fresnel lens adapted to collimate converging light introduced thereto, and the second optic comprises a Fresnel lens adapted to cause said collimated light exiting therefrom to substantially converge.

43. A color display according to claim 42 that is operable to produce at least the colors black, white, red, green, blue, cyan, yellow and magenta.

44. The color display of claim 36 in which the first optic includes a mirror, and the second optic includes a translucent screen having a back surface on which an image can be displayed and a front surface from which the image can be viewed, said screen being disposed about a spring loaded roller from which it can be unrolled for use and rolled for storage.

45. A method of producing a color display comprising the steps:
collimating illuminating light;
linearly polarizing said collimated light with a first polarizer;
passing said collimated polarized light through a first display subassembly that includes a liquid crystal panel with a plurality of independently operable pixels;
said passing step including elliptically polarizing the linearly polarized light so that different wavelengths of light are rotated to different angular orientations;
analyzing light exiting the first display subassembly with a second polarizer to attenuate therefrom wavelengths of light cross polarized relative to the second polarizer, said analyzing step thereby yielding linearly re-polarized light from which certain wavelengths have been attenuated;
passing said linearly re-polarized light through a second display subassembly that includes a liquid crystal panel with a plurality of independently operable pixels;
said second passing step including elliptically polarizing the linearly re-polarized light so that different wavelengths of light are rotated to different angular orientations;
analyzing light exiting the second display subassembly with a third polarizer to attenuate therefrom wavelengths of light cross polarized relative to the third polarizer, this analyzing step thereby yielding linearly polarized light from which additional wavelengths have been attenuated; and
converging the linearly polarized light from the third polarizer;
wherein:
the elliptical polarization effected during the first passing step differs from elliptical polarization effected during the second passing step due to different values of $\Delta$nd exhibited by the first and second display subassemblies; and
at least one of said first, second or third polarizers is dyed a color other than black;
and the method further includes:
applying a first dynamic signal to a pixel in the first liquid crystal panel; and
applying a second dynamic signal different from the first dynamic signal to a pixel in the second liquid crystal panel.

46. The method of claim 45 which further includes independently varying the first and second dynamic signals among more than two values.

47. The method of claim 45 in which the passing steps each further includes passing light through a supertwisted nematic liquid crystal panel.

48. The method of claim 45 in which at least one of the passing steps includes passing light through:
a birefringent liquid crystal panel;
a first passive layer that minimizes the birefringent effect exhibited by the birefringent liquid crystal panel; and
a second passive layer that introduces a birefringent effect.

49. A color display comprising, in combination:
first and second display subassemblies each having a net $\Delta$nd value greater than 0.5 $\mu$m, each including a liquid crystal panel defining a plurality of independently operable pixels, which exhibit a birefringent effect that varies in response to a signal applied thereto, said first subassembly having a net $\Delta$nd value at least 0.05 $\mu$m greater than the net $\Delta$nd value of the second subassembly;
a first polarizer interposed between the two display subassemblies; and
a second and a third polarizer sandwiched about the two display subassemblies wherein at least one of the first, second or third polarizers is colored a color other than black.

50. The color display of claim 49 in which the first and second liquid crystal panels are each supertwisted nematic liquid crystal panels.

51. The color display of claim 49 in which at least one of the first and second liquid crystal panels comprise:
a birefringent liquid crystal panel;
a first passive layer that minimizes the birefringent effect exhibited by the birefringent liquid crystal panel; and
a second passive layer that introduces a birefringent effect.

52. The color display of claim 49 which further comprises:
a third display subassembly having a net $\Delta$nd value at least 0.05 $\mu$m greater than the net $\Delta$nd values of the first and second panels; said third display subassembly including a liquid crystal panel and defining a plurality of independently operable pixels;
a fourth polarizer; and
said third display subassembly interposed between the third and fourth polarizers;
wherein:
all three of the subassemblies have $\Delta$nd values greater than 0.5 $\mu$m.

53. A subtractive color display method that includes the steps:
providing a birefringent display subassembly that includes a nematic liquid crystal cell and that defines a plurality of independently operable pixels, wherein a birefringent effect exhibited by one of said pixels varies in response to an electrical signal applied thereto;
operating the display subassembly in conjunction with entrance and exit polarizers;
linearly polarizing light entering the pixel by passing it through the entrance polarizer;
elliptically polarizing said linearly polarized light as it passes through the pixel, whereby different wavelengths of light are oriented at different angular orientations when they exit the pixel, the elliptical polarization when a first electrical signal is applied to said pixel differing from the elliptical polarization when a second electrical signal is applied to said pixel;
analyzing the elliptically polarized light exiting the pixel so that light oriented orthogonally to an axis of the exit polarizer is attenuated by the exit polarizer;
wherein:
when the first electrical signal is applied to the pixel, the birefringence of the pixel orients a first wavelength of light orthogonally to the axis of the exit polarizer, thereby causing its attenuation by the exit polarizer; and when the second electrical signal is applied to the pixel, the different birefringence of the pixel orients the first wavelength of light so that it is no longer oriented orthogonally to the axis of the exit polarizer, thereby permitting it to pass through the exit polarizer relatively less attenuated;

wherein the exit polarizer is dyed to pass wavelengths of light, other than the first wavelength, relatively unattenuated regardless of their orientation, thereby improving the transmission of said wavelengths of light and optimizing the resulting display brightness of the subtractive color display.

54. A subtractive color display method that includes the steps:

providing a birefringent display subassembly that includes a nematic liquid crystal cell and that defines a plurality of independently operable pixels, wherein a birefringent effect exhibited by one of said pixels varies in response to an electrical signal applied thereto;

operating the display subassembly in conjunction with entrance and exit polarizers;

linearly polarizing light of a first wavelength entering the pixel by passing it through the entrance polarizer;

elliptically polarizing light as it passes through the pixel, whereby different wavelengths of light are oriented at different angular orientations when they exit the pixel, the elliptical polarization when a first electrical signal is applied to said pixel differing from the elliptical polarization when a second electrical signal is applied to said pixel;

analyzing the elliptically polarized light exiting the pixel so that light oriented orthogonally to an axis of the exit polarizer is attenuated by the exit polarizer;

wherein:

when the first electrical signal is applied to the pixel, the birefringence of the pixel orients the first wavelength of light orthogonally to the axis of the exit polarizer, thereby causing its attenuation by the exit polarizer; and when the second electrical signal is applied to the pixel, the different birefringence of the pixel orients the first wavelength of light so that it is no longer oriented orthogonally to the axis of the exit polarizer, thereby permitting it to pass through the exit polarizer relatively less attenuated;

wherein the entrance polarizer is dyed to pass wavelengths of light, other than the first wavelength, relatively unattenuated regardless of their orientation, thereby improving the transmission of said wavelengths of light and optimizing the resulting display brightness of the subtractive color display.

55. In a color display system comprising:

a first, second and third polarizer;

first and second cells comprising supertwisted nematic type liquid crystal material, said cells exhibiting a birefringent effect and having different values of $\Delta nd$, said cells having a plurality of independently operable pixels and disposed in a stacked arrangement with said polarizers;

said first polarizer interposed between said first and second cells and said second and third polarizers disposed outside the stacked arrangement adjacent to said first and second cells, respectively, whereby said first cell in cooperation with said first and second polarizers provides spectral response different from said second cell in cooperation with said first and third polarizers.

56. The color display system of claim 55 further comprising a passive compensation layer adjacent to one of said cells.

57. The color display system of claim 55 which further includes at least two polarizers adjacent different surfaces of the first and second portions, each of said two polarizers being dyed a color other than black.

58. A color display system comprising:

a first and second portion in stacked arrangement; each portion including an optical element defining a plurality of independently operable pixels and exhibiting a birefringent effect that varies in response to an applied signal;

a first polarizer interposed between said first and second portion;

a second and third polarizer sandwiched about said stacked portions, said second and third polarizers colored a color other than black so that the leakage characteristics of said second and third polarizers do not overlap;

the first portion, in combination with said first and second polarizers, exhibits a first spectral response when driven with a first signal; and the second portion, in combination with said first and third polarizers, exhibits a second spectral response when driven with the first signal.

59. The color display system of claim 58 in which the portions exhibit different spectral responses and different values of $\Delta nd$, each of which is greater than 0.50 $\mu m$;

60. The color display system of claim 58 in which the different spectral responses are achieved by inclusion of a passive optical element in one of said portions.

61. The color display system of claim 60 in which the passive element is a retardation film.

62. A color display comprising:

first and second stacked birefringent display subassemblies, each having a supertwisted nematic liquid crystal panel defining a plurality of independently operable pixels, said first and second display subassemblies stacked so that corresponding pixels in each of said subassemblies are linearly aligned, at least one of said display subassemblies having a value of $\Delta nd$ greater than 1.05 micrometers;

a first polarizer disposed between said first and second subassemblies;

second and third polarizers sandwiched about said first and second subassemblies, said second and third polarizers colored different primary colors selected from the list: red, green and blue whereby each pair of corresponding pixels in the first and second display subassemblies can be cooperatively operated to produce all the colors comprising red, green, blue, yellow, magenta, cyan, black and white.

63. The color display of claim 62 wherein:

the first and second display subassemblies each includes a supertwisted nematic panel;

at least one of said display subassemblies exhibits a value of $\Delta nd$ greater than 1.05 micrometers; and each pair of corresponding pixels in the first and second display subassemblies can be cooperatively operated to produce all the primary and secondary colors (red, green, blue, yellow, magenta and cyan), together with black and white; wherein a true, eight color display can be produced with a stack of just two liquid crystal panels.

64. The color display of claim 63 wherein:
at least one of the display subassemblies exhibits a value of $\Delta nd$ greater than 1.15 micrometers.

* * * * *